United States Patent [19]

Wilson et al.

[11] Patent Number: 4,841,526
[45] Date of Patent: Jun. 20, 1989

[54] DATA COMMUNICATIONS SYSTEM
[76] Inventors: Jon C. Wilson, 200 N. Maryland Ave., #301, Glendale, Calif. 91206-4236; David A. Shick, 27366 Compostela, Mission Viejo, Calif. 92692; Robert L. Haynie, 16181 Jasmine Way, Los Gatos, Calif. 95030; Donald R. Wilder, 525 Gabilan St. #8, Los Altos, Calif. 94022; Larry D. Zimmerman, 4504 Poinsettia, San Jose, Calif. 95136; Richard M. LeCour, 225 Massol Ave., Los Gatos, Calif. 95030; D. James Guzy, 1340 Arbor Rd., Menlo Park, Calif. 94025

[21] Appl. No.: 932,926
[22] Filed: Nov. 19, 1986

Related U.S. Application Data

[63] Continuation-in-part of Ser. No. 614,283, May 25, 1984, abandoned.
[51] Int. Cl.[4] .............................. G08C 25/02
[52] U.S. Cl. .............................. 371/32; 371/5
[58] Field of Search .............................. 371/32, 33, 5
[56] References Cited

U.S. PATENT DOCUMENTS

| | | | |
|---|---|---|---|
| 3,473,150 | 10/1969 | McClelland | 371/32 X |
| 3,534,264 | 10/1970 | Blasbalg et al. | 371/5 |
| 3,876,970 | 4/1975 | Winn et al. | 371/32 |
| 3,979,719 | 9/1976 | Tooley et al. | 371/32 |
| 4,110,558 | 8/1978 | Kageyama et al. | 371/5 |
| 4,144,522 | 3/1979 | Kageyama et al. | 371/32 |
| 4,149,142 | 4/1979 | Kageyama et al. | 371/32 |
| 4,270,205 | 5/1981 | DeShon | 375/5 |
| 4,422,171 | 12/1983 | Wortley | 371/32 |
| 4,439,859 | 3/1984 | Donnan | 371/32 |

OTHER PUBLICATIONS

*Computer Networks,* Andrew S. Tanenbaum, Prentice-Hall, Inc., Englewood Cliffs, N.J., 1981, p. 155.
*NTX Cross Domain Facilities,* NTX Communications Corp., Sunnyvale, Calif., 1986.
"Windows in the Sky—Flow Control in SNA Networks with Satellite Links", G. A. Grover & K. Bharath-Kumar, IBM Systems Journal, vol. 22, No. 4, 1983.
*AFIPS Conference Proceedings,* 1980 Nat'l Computer Conf., Anaheim, Calif., May 19-22, 1980, pp. 105-112, AFIPS Press, Arlington, Va., M. A. Reed et al., "ARQ Performance in SNA Network".
*IBM Technical Disclosure Bulletin,* vol. 24, No. 11B, Apr. 1982, pp. 6153, 6154, New York, W. D. Brodd: "Selective Acknowledgement and Retransmission in a Packet Switched Network".
*Proceedings of the IEE,* vol. 120, No. 8, Aug. 1973, pp. 846-851, London, GB; B. Zacharov: "Transmission Strategy and Optimal Block Size in High-Speed Data Communication".
*Computer Design,* vol. 22, No. 3, Mar. 1983, pp. 195-206, Winchester, Mass., A. J. Weissberger: "Bit Oriented Data Link Controls".
*Compilation of Data Communications Standards,* 1978, pp. 989-1115, edited by H. C. Folts et al.; McGraw-Hill Publish. Col, New York: "Federal Standard 1003 (proposed); Telecommunications: Synchronous Bit Oriented Data Link Control Procs".
*Hewlett–Packard Journal,* vol. 29, No. 7, Mar. 1978, pp. 21-26, Palo Alto, Calif., J. R. Nielsen et al.: "Data Entry and Communications Systems Have Network Capabilities".

*Primary Examiner*—Salvatore Cangialosi
*Attorney, Agent, or Firm*—Majestic, Parsons, Siebert & Hsue

[57] ABSTRACT

A data communications system employing sliding window protocol where the size of the window of the sending or receiving station can be made selectable by the user according to the speed, length or error rate of the communication link or the frame size used to maximize the utilization of the communication link. The negative acknowledgements sent by the receiving station specifies the upper and lower limit of a range of identification numbers of frames unsuccessfully received to increase efficiency. Before data is transmitted, the sending and receiving stations exchange the preferred sets of link parameters and generate a modified set of link parameters to resolve potential conflicts. Either the sending or the receiving station stores a table defining the frame sizes for use with different bit error rates of the communication link. The station then evaluates the current bit error rate to select the optimum frame size from the table and adjust the frame size accordingly.

10 Claims, 15 Drawing Sheets

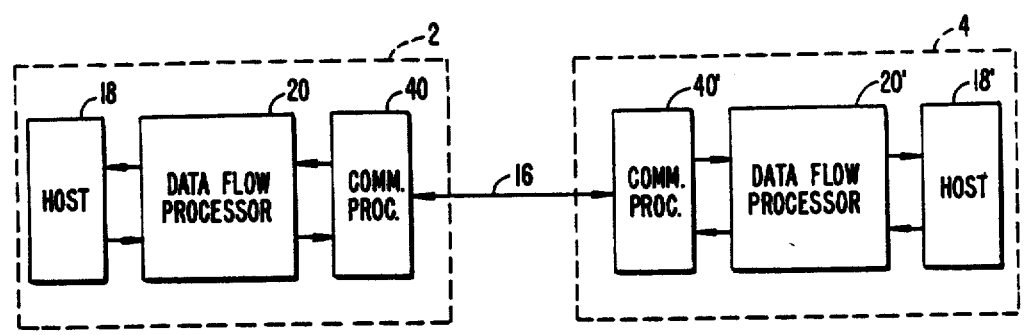
FIG._1.
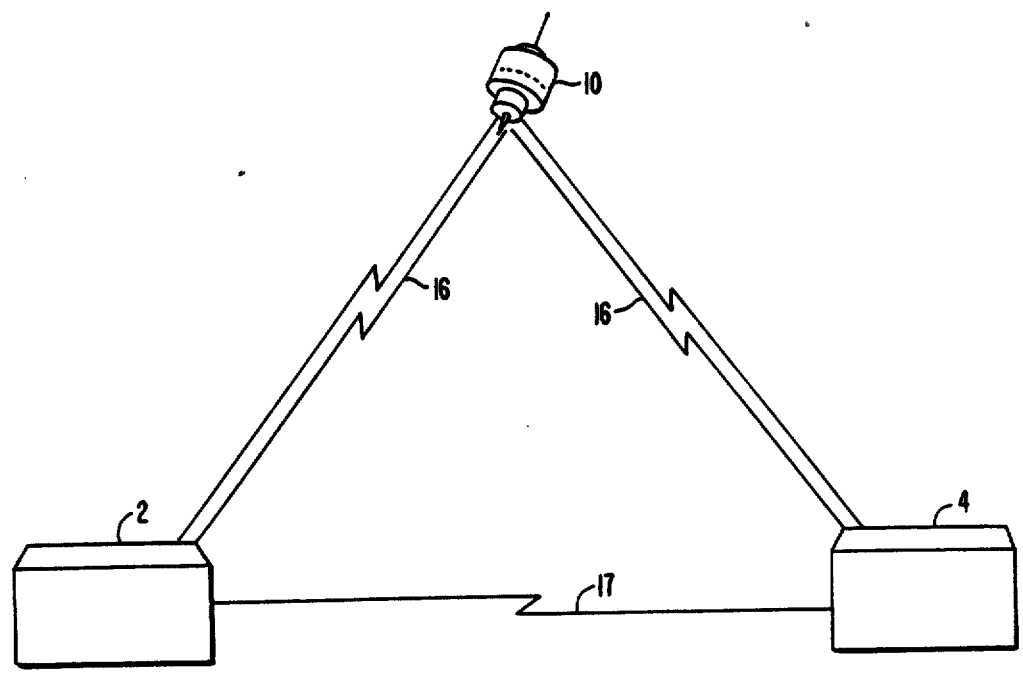
FIG._2.

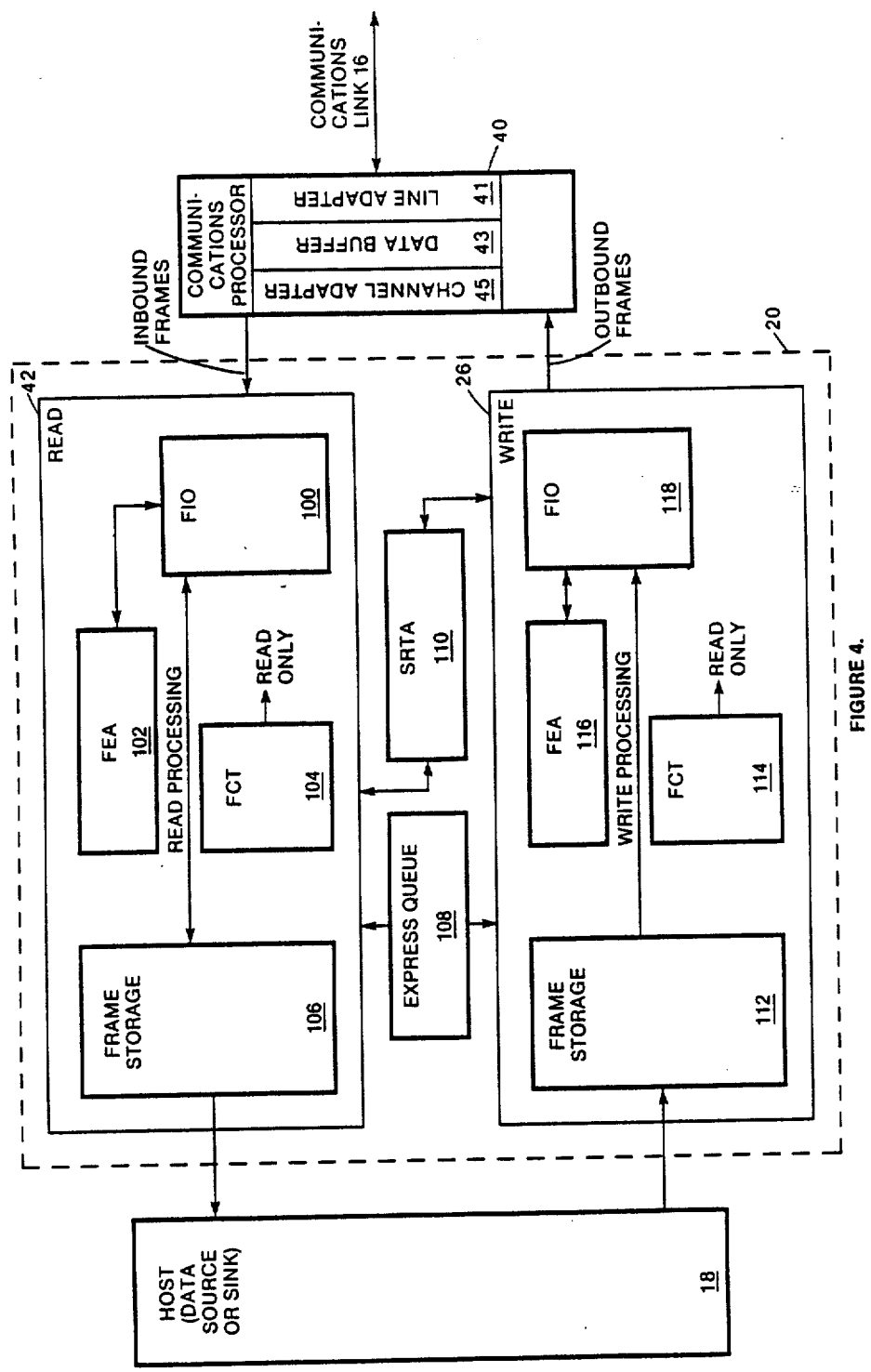

DATA COMMUNICATIONS SYSTEM

CROSS REFERENCE TO RELATED APPLICATION

This application is a continuation-in-part application of "Method And Apparatus For High Speed Satellite Communication", Ser. No. 06/614,283, filed May 25, 1984, now abandoned. cl BACKGROUND OF THE INVENTION This invention relates in general to data communication and particularly to a data communication system which efficiently communicates data over a variety of communication links.

Information gathering, processing and distribution has become an increasing important aspect of modern day life. Together with the unprecedented growth of the amount of information gathered and processed, there is increasing need for the capability to transfer data at a variety of speeds between separated locations. Different types of communication links have been used for transfer of data. One type of common carrier communication link is terrestrial such as a cable or a leased phone line. Other common carriers may include high speed satellite links. These links may have different lengths, operate at different error rates and transfer data at very different speeds. Since a variety of communication links with different characteristics may be available between two locations, it is advantageous to choose the communication link which is the most economical and efficient for the particular type of data transfer desired. It is therefore desirable to provide a communication system which is flexible and dynamically adjustable and which is efficiently used for data transfer over communication links having different characteristics.

Communications protocols based on a layered network architecture have been developed for the transfer of data between remote host computers. Because of the value and precision of the data transferred, it is absolutely essential that all the data be correctly transferred particularly in the face of predictable errors caused by the communications links used for the data transfer. Communication protocols have therefore been developed for transmitting data in discrete blocks known as frames, for evaluating whether the data are correctly received, for communicating to the sending station which data frames are in error and for retransmitting such data frames. The Synchronous Data Link Control (SDLC) developed by International Business Machines Corporation (IBM) and the High Level Data Link Control (HDLC) published by the International Standards Organization are examples of communications protocols which are currently used.

Where a sending station is transmitting data through a communication link to a receiving station, both stations must define their link parameters for the data transfer. Where the resources available to the two stations are different, there may be conflicts between the link parameters designated by the two stations. It is therefore desirable to provide a data communications system where such conflicts can be resolved in a simple manner.

The interchange of information between stations on an SDLC or HDLC link is controlled by sequence numbers within the frame. The two types of sequence numbers are: Send Sequence Number, $N_S$, and Receive Sequence Number, $N_R$. The $N_S$ indicates to the receiving host the sequence number of the next frame that will be transmitted by the sending host. As each frame is sent, the sending host increments the $N_S$ that it sends by 1. $N_R$ is used to acknowledge which frames have been successfully received, and to indicate to the sending host which information frame the receiving host expects to receive next. In SDLC and HDLC, $N_R$ always acknowledges that all frames up to $N_R$ have been successfully received.

SDLC uses 3-bit sequence numbers that may contain the digits 0 through 7. SDLC thereby allows for up to 7 frames to be outstanding (frame transmitted but not acknowledged). HDLC allows for 3-bit and, in extended mode, 7-bit sequence numbers which may contain the sequence numbers 0 through 7 and 0 through 127, respectively. HDLC would allow for up to 127 frames to be outstanding. The two protocols use similar error detection algorithms and error recovery techniques to verify the successful receipt of a transmitted frame.

Upon detection of a missing frame, or a frame in error, SDLC uses a technique that is called "Go-back-n". Use of this technique requires the receiving host to reject all frames that have been received after the frame in error, whether or not these frames are correctly received.

As an example, suppose the sending host has sent frames numbered 1, 2, 3, 4 and 5 and that frame number 2 was destroyed in transit. The receiving host using the SDLC technique, will reject frame number 2 and discard frames numbered 3, 4, and 5. The sending host then must retransmit the frames numbered 2-5. In this example it is easy to see that retransmission of frames 3, 4, and 5 is redundant and that link utilization would be more efficient if such redundant transmission were not required.

Another general strategy for handling data frames received in error, known as selective repeat or selective reject, is described in *Computer Networks*, by Andrew S. Tanenbaum, Prentice-Hall, Inc., Englewood Cliffs, N.J., 1981, p. 155. In this alternative strategy, all the correct frames following the bad one received by the receiving host are stored in its buffer. The receiving host again sends a negative acknowledgement to the sending host. When the sending host finally becomes aware that something is wrong, it simply identifies and retransmits the one bad frame from its buffer, but not all its successfully transmitted successors. Thus, by providing a buffer for storing the correct frames following the bad one, only the one bad frame needs to be re-transmitted.

Data communications systems employing the above-described concepts are described for example in U.S. Pat. No. 3,979,719 to Tooley et al. and in U.S. Pat. No. 4,422,171 to Wortley et al. None of the above-described systems are entirely satisfactory. It is therefore desirable to provide data communication systems having improved qualities.

SUMMARY OF THE INVENTION

The data frames transmitted from a first station to a second station typically includes data and an identification number, where the identification numbers of the frames are typically assigned in the sequential order of transmission to facilitate frame identification. To confirm that the data frames received by the second station are correct and in the correct sequence, it is necessary for the receiving station to utilize verification techniques for each frame received and communicate to the sending station that the frames were indeed correctly received by sending a properly formatted acknowledgement for each of these data frames including their identification numbers. Since it is necessary for the sending station to receive confirmation of the correct receipt of data frames from the receiving station before it considers the transmission complete, the sending station typically is equipped with the capability of storing transmitted-but-not-yet acknowledged data frames. The sending station evaluates the acknowledgement information received from the receiving station and uses it to discard from its buffer those data frames acknowledged as correctly received, in order to make room for additional data frames to be transmitted. Thus the sending station assigns and monitors a variable range of identification numbers for data frames stored in its buffer, thereby restricting the total number of such frames within the defined first window. The sending station evaluates the acknowledgement information received from the receiving station in order to shift the upper and lower limits of the window.

The receiving station establishes a second window having an upper and lower limit for a variable range of identification numbers of possible data frames from the sending station acceptable to the receiving station. The receiving station evaluates the data frames received from the sending station to shift the upper and lower limits of the second window. The difference between the upper and lower limits of each of the first and second windows defines its size. Up to this point, a previously known system using a protocol known as the sliding window protocol is described, wherein the window consists of that subset of data to be transmitted which has been initiated into the transmission process but not yet successfully terminated out of that process by the two stations involved.

One aspect of the invention is based on the observation that the size of the first or the second window or both can be made selectable by the user according to the speed, length or error rate of the communication link or the frame size used in connection therewith. Thus, for lengthy communication links such as satellite links with long delay times (thousands or millions of frames in transit) between the sending and receipt of data frames, it is desirable to select large window sizes. The selection of large window sizes requires a larger storage buffer but allows a sending station to continuously transmit frames without having to interrupt transmission while awaiting acknowledgements from the receiving station. A large window size allows a receiving station to continuously receive data frames without having to reject data frames because of the fact that the identification numbers of these frames falls outside its window.

The above described feature of the extensible window size is advantageous since it allows the user to select a window size that is the most efficient and economical for the particular communication link used. This greatly increases the flexibility in selecting communication links and reduces the cost of data transfer by efficient utilization of the link bandwidth. The tradeoff between link utilization and required buffer size has benefitted in recent year because the cost of storage has decreased at a faster rate than the cost of transmission.

In many communication systems, the receiving station also sends negative acknowledging information to the sending station to indicate every data frame which has been unsuccessfully received. A second aspect of the invention is directed to a communication system where a single negative acknowledgement message sent by the receiving station specifies both the upper and lower limits of a range of identification numbers of frames unsuccessfully received. In other words, the receiving station need send only a message containing two identification numbers to identify a range of data frames incorrectly received. This feature enables the communication system to avoid the necessity of sending the identification number of each and every data frame incorrectly received, thereby improving the efficiency of the system. This feature is particularly advantageous where, for example, a burst error in the communication link causes a large number of consecutive data frames to be lost or damaged in the transmission.

The sending and receiving stations each maintains a preferred set of link parameters related to the resources available to it. A third aspect of the invention is directed to a communication system comprising a first and a second station where, before data is transmitted, the two stations exchange the preferred sets of link parameters and generate a modified set of link parameters representing a satisfactory compromise between the two sets of preferred parameters. This allows potential conflicts between the parameters of the two stations to be resolved and minimizes the adverse impact of such conflicts on data transfer.

Predictably the error conditions of a communication link vary with time. Differential error rates have different impacts on data transfer, particularly as a function of frame size. When the error rate is low, it is desirable to use large frames containing data bit streams with many bits. Given a low error rate, the bit errors introduced by the link cause relatively few data frames to be transmitted incorrectly, even where the frames contain a large number of bits. Large frames, mostly transmitted error free, maximize bandwidth utilization. When the error rate is high, however, the probability increases that large frames will be transmitted in error, thereby requiring retransmission. In such event it is desirable to reduce the frame size. A fourth aspect of the invention is directed to a communication system comprising a sending and a receiving station where the sending station automatically evaluates error conditions of the communication link to vary dynamically the frame size; this increases the overall efficiency of communication link utilization. In the preferred embodiment, at least one of the two stations stores a table defining the frame sizes for use with different bit error rates of the communication link for substantially optimizing the efficiency of link utilization. Such station evaluates the current bit error rate of the link measured by percentage of rejected frames, selects the optimum frame size from the table, and adjusts the transmission frame accordingly.

BRIEF DESCRIPTION OF THE DRAWINGS

FIG. 1 is a block diagram of a communication system illustrating the invention.

FIG. 2 illustrates data communication across asymmetrical communication links to illustrate the invention.

FIG. 4 is a conceptual block diagram of the functional elements of the data flow processor in accordance with the present invention.

FIG. 17 provides a detailed flow diagram of MOVEFRM step 342 of FIG. 13.

DESCRIPTION OF THE INVENTION

Figure 3:
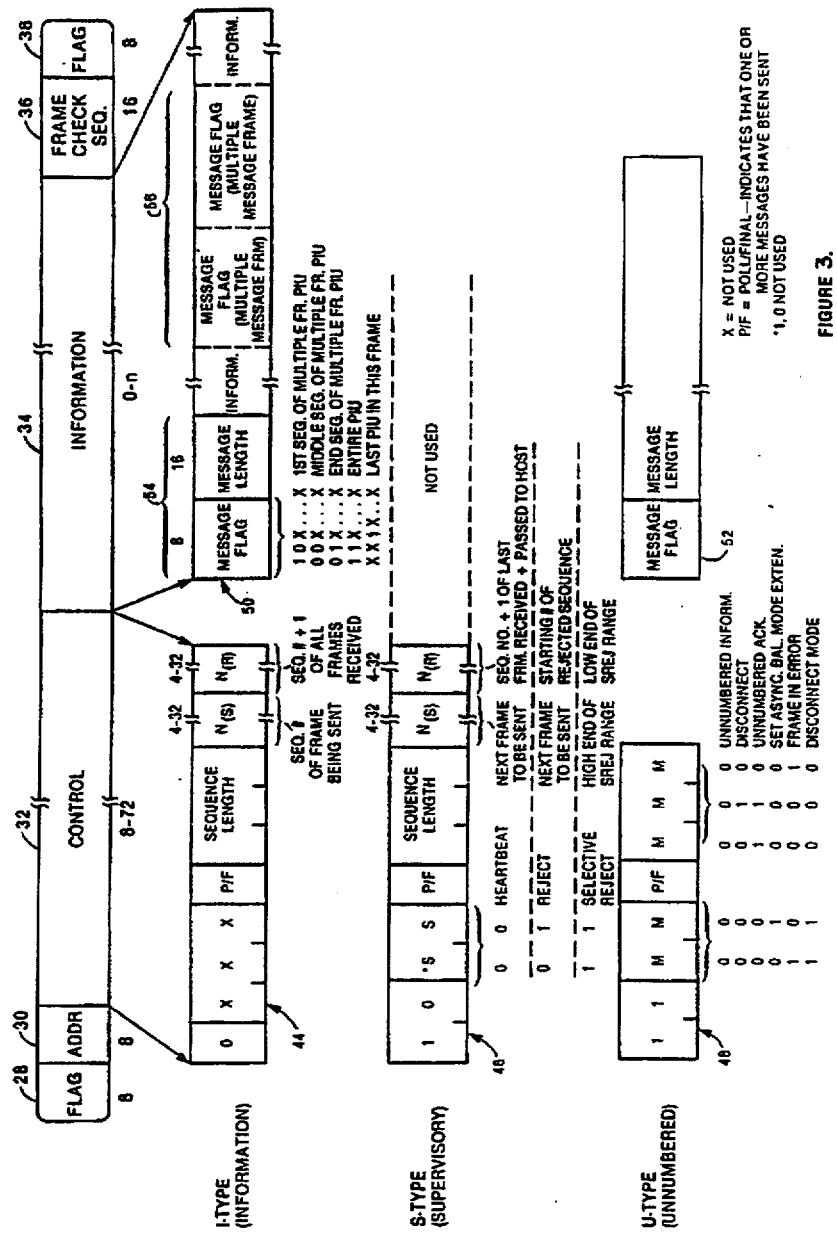
FIG. 3 illustrates the frame format in accordance with the preferred embodiment of the present invention.

FIG. 1 is a conceptual block diagram of two stations 2 and 4 illustrating the invention. As shown in FIG. 1 stations 2 and 4 are connected by a communication link 16. Data is transferred from station 2 to station 4; station 2 is referred to below as the sending station and station 4 as the receiving station. Station 4 examines the data frames received from station 2 through link 16 and sends acknowledgement information through link 16 to station 2. The acknowledgement information may be sent to station 2 in the form of data groups including control information and the acknowledgement information. Alternatively, the acknowledgement information may be "piggybacked" onto data frames in the return traffic sent by station 4 to station 2. Such piggybacking schemes are well known in the art.

Each of the stations comprises a host 18 or 18', a data flow processor 20 or 20' and a communication processor 40 or 40'. Host 18 of the sending station supplies data to data flow processor 20 and communication processor 40 for preprocessing the data for transmission through link 16. Host 18' of station 4 is the destination of the data transferred from host 18 and receives the data after it is processed by communication processor 40' and data flow processor 20'. The hosts 18, 18' may be computers or other data sources and sinks. Host 18, 18' may be part of the sending and receiving stations as shown in FIG. 1. Alternatively these hosts may be separate from the sending and receiving stations themselves but linked to the stations by a conventional means. Thus while in FIG. 1 the stations are shown to include the hosts, it will be understood that the invention is applicable whether such hosts are part of or separate from the stations. The data flow processors 20, 20' may be distinct pieces of hardware or can be implemented within the hosts in a form of a series of instructions executed by the host for processing the incoming and outgoing frames of information. The detailed structure and functions of the data flow processors will be explained below.

FIG. 2 is a schematic view of a data communications system employing asymmetrical communication links between stations to illustrate the invention. As shown in FIG. 2, station 2 may transfer data to station 4 via a satellite link 16, which includes a satellite 10. Communication link 16 normally includes both a forward channel from station 2 to station 4 and a return channel from station 4 to station 2, where the forward and return channels have essentially the same characteristics. If the level of information traffic from station 2 to station 4 and from station 4 to station 2 require essentially the same communication capacity, it is desirable to employ both the forward and return channels of link 16 for the two-way traffic.

In some applications, however, the traffic from station 4 to station 2 may be at a much lower level than the traffic from station 2 to station 4. In such event it may be desirable to free the return channel of link 16 for other purposes and employ a separate communication link 17 for transferring communication data from station 4 to station 2 as shown in FIG. 2. Then the return channel of link 16 from station 4 to station 2 may be utilized for an entirely separate purpose. Link 17 may, for example, be a slow inexpensive terrestrial line such as a leased telephone line. The scheme illustrated in FIG. 2 may be used for example where the only traffic from station 4 to station 2 is that of acknowledgement information acknowledging data frames received through link 16.

FIG. 3 illustrates the frame format in accordance with the preferred embodiment of the invention. As shown in FIG. 3, a typical frame includes flag bits 28, an address 30, control field 32 which indicates the type of frame, the information itself 34, a frame check sequence 36 and a flag 38. Address 30 can be that of the station to which the information is to be sent, that of the station sending a response, or a broadcast address.

The control field identifies the nature of the frame, for example, an information frame, a supervisory frame, or an unnumbered frame.

Information frames are used for transferring data between stations. The sequence number $N_S$ is the identification number for the information frame. Typically the information frames are numbered in the same order as their transmission. The setting of the sequence length subfield in the control field determines the length of the sequence number subfields $N_S$, $N_R$ that follow it and hence the maximum sequence number. In the preferred embodiment, the maximum sequence length may be set between 0 and 7 bits. The setting of the maximum sequence length may be used to determine the length of $N_S$, $N_R$ as follows. When the maximum sequence length is set to 0 bit, the sequence number subfields $N_S$, $N_R$ are each 4 bits in length so that the sum of the two subfields is 1 byte in length. When the maximum sequence length is set to 1 bit, the sequence number subfields $N_S$, $N_R$ are each 8 bits in length (or a total length of 2 bytes for the two subfields), and so on until when the maximum sequence length is 7 bits, the sequence number subfields $N_S$, $N_R$ are each 32 bits in length for a sum total length of 8 bytes. Hence, when the maximum sequence length is set between 0–7 bits, $N_S$ and $N_R$ each ranges in length between 4 and 32 bits. Where $N_S$, $N_R$ are each 32 bits in length, the maximum sequence number is over 4 billion.

In reference to FIGS. 1 and 3, data flow processor 20 of sending station 2 stores the information frames already transmitted through link 16 but yet unacknowledged by station 4. Data flow processor 20' of station 4 stores the data information frames received from station 2 which have not yet been transmitted to host 18'. Station 4 evaluates the data information frames received through link 16 from station 2 and sends acknowledgement information through link 16 back to station 2. When station 2 receives the acknowledgement information that a certain data frame has been successfully received, the data flow processor 20 may then discard the frame from its memory, thereby freeing some memory space for accepting new data from host 18. In such manner the data flow processors perform the important function of retaining a copy of in transit data until having assured that the data transferred from host 18 to host 18' are correct and in the correct sequence.

This invention employs an improved sliding window protocol for data transmission. Sliding window protocols are described in Section 4.2 of *Computer Networks*, by Tanenbaum referenced above. The several paragraphs below summarize the description in the section.

In a sliding window protocol, at any instant of time, the sending station maintains a list of consecutive sequence numbers corresponding to frames it is permitted to send, where the list defines the sending window. The receiving station maintains a receiving window corresponding to frames it is permitted to accept. Whenever a new message arrives from the host, it is given the next highest sequence number, and the upper limit of the window is advanced by 1. When an acknowledgement comes in, the lower limit is advanced by 1. In such manner the window continuously maintains a list of unacknowledged frames. The sending station must store the data frames which are currently within its window. When a sending station receives indication from the receiving station that these data frames are lost or damaged, they can be retransmitted. Thus, if the maximum window size is n, the sending station need n buffers to hold the unacknowledged frames. If the window ever grows to its maximum size, the sending station must forcibly shut down the host until another buffer becomes free.

The window of the receiving station corresponds to the frames it may accept. Any frame falling outside a window is discarded. When a frame whose sequence number equal to the lower limit of the window is received, it is passed to the host. An acknowledgement is generated for such frame, and the upper and lower limits of the window are advanced by one.

For better efficiency, it is desirable for the receiving station to accept and store the data frames following a damaged or lost frame. In such event, further restrictions must be imposed on the sending and receiving stations. As explained on pages 160 and 161 of *Computer Networks*, by Tanenbaum referenced above, the maximum window size for both stations should be at most half the range of the sequence numbers. In other words if the maximum sequence number is said to be MaxSeq, the maximum window size will be (MaxSeq+1)/2. We are now ready to return to the description of the sliding window protocol of the preferred embodiment of the invention.

Figure 5A:
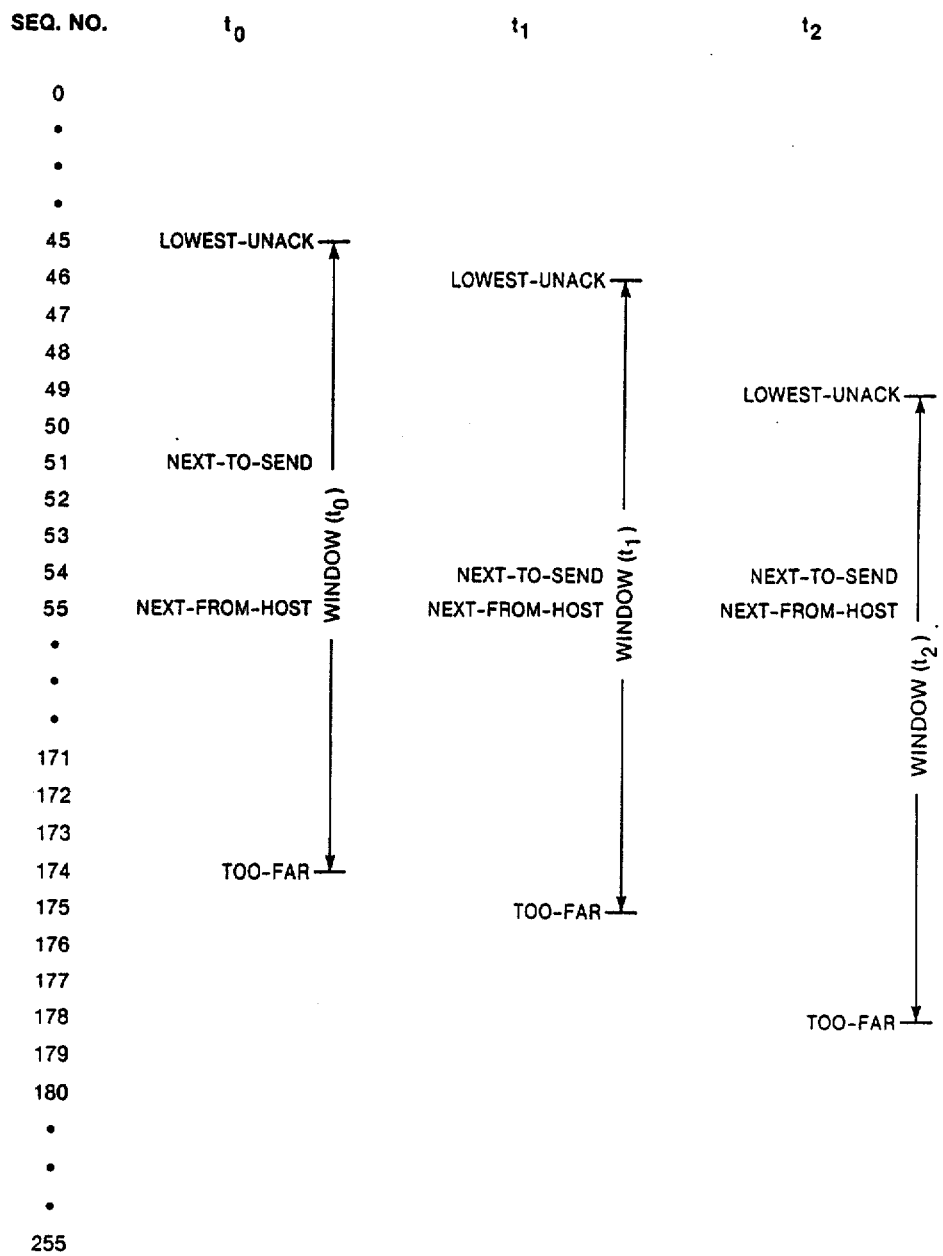
FIG. 5A and 5B illustrate the send/receive frame table maintained in accordance with the present invention.
Figure 5B:
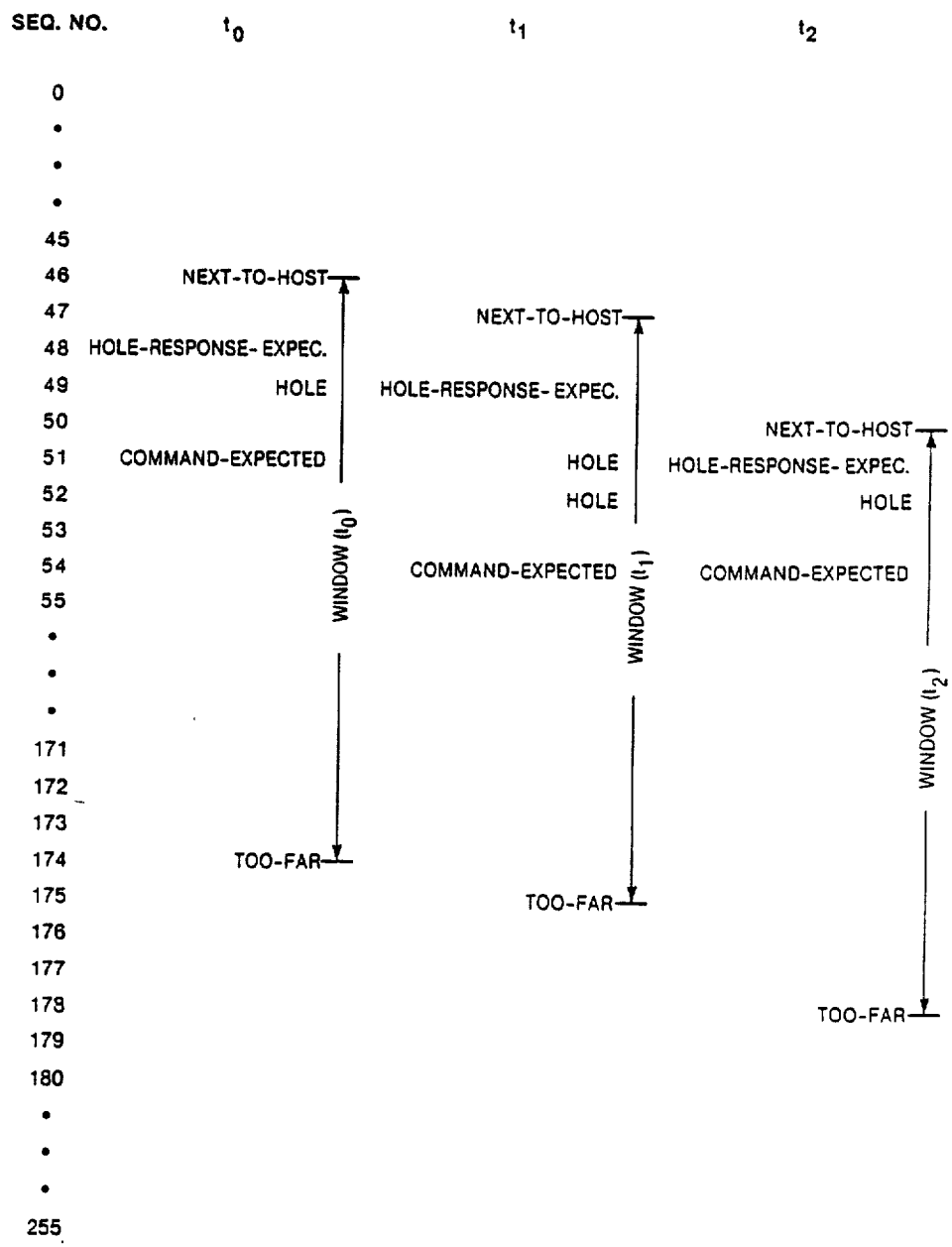

FIGS. 5A, 5B illustrate a sliding window protocol adopted by stations 2 and 4 to insure that data is correctly transferred from station 2 to station 4 and in the correct sequence. Data flow processor 20 of the sending station 2 includes memory or temporary storage area for storing information which the processor constantly checks and updates to insure that data is correctly transferred. FIG. 5A illustrates the entries in the temporary storage area of data flow processor 20 in the sending station. FIG. 5B illustrates the entries made in the temporary storage area of the data flow processor 2' in the receiving station.

In FIGS. 5A and 5B, it is assumed that the maximum sequence length is designated to be 256 frames long. Thus the sequence numbers of the data frames may range from 0 to 255 and MaxSeq is 255. Therefore, the maximum window size for stations 2, 4 is 128.

The optimum window size is a function of a number of communication link characteristics. Thus, in the case of a satellite communication link, there is considerable delay between the transmission from station 2 and its receipt by station 4. In such event it would be advantageous to employ a window size which is large. If the window size is too small, the window of the sending station will be full long before the sending station receives acknowledgement of any frames in the window. This prevents the sending station from sliding its window upwards and therefore prevents it from sending any more data frames. Thus the sending station will be idle for a large percentage of the operating time of the system, and the bandwidth capacity of the link will be vastly underutilized. The optimum window size is also a function of other link characteristics such as its speed, error rate and the frame size used.

In previously known sliding window protocols, the range of maximum sequence numbers is fixed. This is the case for example in the data communications systems described by Tooley et al. in U.S. Pat. No. 3,979,719 and by Wortley et al in U.S. Pat. No. 4,422,171. With a fixed maximum sequence length, the maximum window size is also fixed. As discussed above, different types of communication links may be available between two stations and it may be more efficient and economical for more than one type of communication link to be employed for transmitting data between the two stations. In such event it is advantageous for the user to be able to specify the maximum sequence length and hence the maximum window size to most efficiently use each such type of communication link. As discussed above, it is desirable to change the window size depending on the length, speed or error rate of the communication link or the frame size used in the transmission. In reference to FIG. 3, the sequence length subfield can be set by the user. This increases the efficiency in utilizing the communication link.

In reference to FIG. 3, supervisory frames are sent by the receiving station 4 to inform the sending station that certain frames are rejected. Thus, where the third and the fourth bits of the supervisory frame are 0 and 1 respectively, the number $N_S$ specifies the next frame to be sent and the number $N_R$ specifies the starting number of the rejected sequence of identification numbers. Where the third and the fourth bits of the supervisory frame are both 1's, selective reject command is indicated and the number $N_S$ indicate the high end or the upper limit of the selective reject range and the number $N_R$ indicates the lower limit of the range. In other words, such a supervisory frame indicates that all the data frames with sequence numbers ranging from $N_S$ down to $N_R$ are all selectively rejected. In previously known protocols, each individual sequence number of the data frame rejected must be specified in the negative acknowledgement sent by station 4. Therefore if a burst error in the communication link causes a large number of consecutive data frames to be lost or damaged, previously known systems require each and every sequence number of such frames to be specified in the selective reject command sent by station 4 to station 2. This multiplicity of reject messages is undesirable and inefficient. By providing the capability to specify the upper and lower limit of a range of selectively rejected frames, the invention greatly improves the efficiency of the communication system.

In reference to FIGS. 1 and 3, sending station 2 sends sequentially numbered frames of information to station 4. Station 4 evaluates the frames of information to determine whether the frames are successfully received. If a particular frame is valid, station 4 stores the information or passes it to its host, depending upon the status of previously received frames. If the previous frames in the sequence were successfully received and have already been passed to the host, station 4 passes the current frame to the host and sends an acknowledgement for that frame back to the sending station and removes that frame from its storage buffer area.

At a sending end, the sending station receives acknowledgement of frames successfully received and rejects or selectively rejects information for frames in error. When an acknowledgement of a correctly received frame is received, station 2 can discard the corresponding frame from the temporary storage buffer area. Where a selective reject command is received, station 2 retrieves the indicated from the temporary storage buffer area and retransmits the frame.

When the retransmitted frame is properly received by the receiving station, an acknowledgement is sent back to station 2. If all the data frames preceding the retransmitted response frame are correctly received and have been passed to the host, the response frame will also be passed to the host. If station 4 has received and stored data frames with sequence numbers following the response frame held in abeyance pending the filling of the hole corresponding to the response frame, such frames are also passed to the host and acknowledged to the sending station.

If a received frame is damaged or is out of sequence, station 4 makes a notation in the temporary storage area that a sequence number is missing. This is called a HOLE. The receiving station transmits a selective reject message to the sending station to selectively reject the frame with that sequence number and retains any correct following frames in its storage buffer area.

In the preferred embodiment, a selective reject command neither implies that all prior frames have been successfully received nor that subsequent frames are flawed so that a multiplicity of rejected frames can be identified for retransmission at any point in time and for any portion of the window.

Communication between stations is initialized in the preferred embodiment through a dialog employing unnumbered frames such as those illustrated in FIG. 3. The unnumbered frames are used to convey the two sets of preferred link parameters of the two stations. Thus, either station 2 or station 4 of FIG. 1 may request communication with the other station so that parameters are subsequently exchanged. Such station may also resolve the received set of preferred link parameters with its own and transmits the modified set of link parameters to the other station. One link parameter which may be exchanged and resolved is the size of the windows employed by the two stations.

In another aspect of the invention, either one or both stations may be used to automatically track the error rate of the communication link and to vary the frame size accordingly. Thus, data can be transmitted using large frame sizes when the error rate is low; this improves line efficiency and reduces host overhead. As the error rate increases, the frame size is automatically reduced in order to decrease the probability that individual frames will be "hit" by errors. Shorter frames can be used to insure successful communication even during periods of extremely high error rates. To enable the stations to automatically select the optimum frame size, a table is compiled which contains entries defining the frame size which are optimal with different error rates. The data flow processor of either or both stations compares the number of rejected frames to the total number of bytes of information transmitted to obtain the effective bit error rate. The processor then simply selects the optimum frame size corresponding to such error rate from the table compiled and stored and adjusts the frame size accordingly. The user can specify the time intervals at which the frame size is to be computed and adjusted and default values for such time intervals may be stored.

DETAILED DESCRIPTION OF THE INVENTION

Referring to FIGS. 5A and 5B, there are provided illustrative examples of the types of entries which the data flow processor 20 or 20' makes in the table that is maintained in the temporary storage areas. FIG. 5A illustrates entries in the temporary storage area when the station is a sending station 2, while FIG. 5B illustrates entries made in the temporary storage area when the station is a receiving station. Assume for purposes of this example that FIG. 5B corresponds to the temporary storage area for a distant receiving station 4.

In the example provided in FIGS. 5A and 5B, it is assumed that the sequence used is 256 frames long. It is also assumed that, at the particular point in time shown, to the distant receiving station 4 has received valid frames for sequence numbers 0 through 47 and 50. It is also to be assumed that the frames corresponding to sequence Nos. 48 and 49 were invalid or were not received, and that the next frame expected to be received by the distant receiving station has sequence number 51.

At the sending station 2, frames have been transmitted corresponding to sequence Nos. 0 through 50, and acknowledgments have been received from the distant receiving station 4 for sequence numbers up to 45. In FIG. 5A, sequence No. 46 has the notation LOWEST_UNACKED, which indicates that this sequence number is the lowest sequence number which has yet to be acknowledged by the distant receiving station. Sequence No. 51 has the notation NEXT_TO_SEND. This indicates that sequence No. 51 will be the next frame to be sent by the sending station 2. Sequence No. 55 bears the notation NEXT_FROM_HOST. This indicates that frames 52 through 54 have been received from the host for transmission, and that the frame corresponding to sequence No. 55 is expected to be the next frame to be received from the host for transmission. Finally, sequence No. 174 bears the notation TOO_FAR. This is the sequence number which corresponds to the highest sequence number which the originating station will be permitted to transmit given that sequence Nos. 46 and higher have yet to be acknowledged.

In accordance with the present invention, this sequence number is determined by adding 1 to the user specified maximum sequence length and dividing by 2.

Thus, if the lowest unacknowledged frame sequence number is 46, the data flow processor will not permit frames having sequence numbers greater than 174=46+((255+1)/2) to be transmitted over the link.

Referring more particularly to FIG. 5B, the notations in the temporary storage area for the distant receiving station will be discussed in greater detail. With respect to sequence number 46, the notation NEXT TO— HOST is present. This indicates that the frame corresponding to this sequence number will be the next frame to be passed to the associated host of the receiving station 4. When the frame is actually passed to the host, the distant receiving station 4 will transmit an acknowledgment of receipt for sequence No. 56 to sending station 2.

The notation COMMAND—EXPECTED is next to sequence No. 51. This indicates that frames having sequence numbers up to, but not including, 51 have been received. Sequence Nos. 48 and 49 have the notation HOLE. This indicates that these frames were not validly received or not received at all. Sequence No. 48 includes the additional notation RESPONSE—EXPEC. This indicates that sequence No. 48 represents the lowest sequence number for which a selective reject has been transmitted for which a response from the sending station 2 has yet to be received. When the response frame for sequence No. 48 is properly received, the distant receiving station 4 will pass frame 48 to the host. Additionally, the distant receiving station 4 will transmit an acknowledgment for sequence No. 48 to the sending station. Finally, the notation RESPONSE— EXPECTED will be shifted to sequence No. 49 to indicate that a response frame for sequence No. 49 is the next expected to be received from the sending station 2.

As with the temporary storage area for the sending station, there is a sequence number which bears the notation TOO—FAR to indicate that if any frames are received which bear sequence numbers equal to or greater than sequence number 174, these frames are considered to be outside of the window and, therefore, invalid. Receipt of such frames indicates a potential problem in the system.

Referring to FIGS. 5A and 5B, columns corresponding to points in time $t_0$, $t_1$, and $t_2$ are shown which illustrate the receipt by the receiving station 4 of commands and response frames from the sending station 2 In FIG. 5A, at time $t_1$, it can be seen that, since $t_0$, the sending station 2 has received an acknowledgement of receipt of frame 45 by receiving station 4 ; has sent out frames 51 through 53; and still expects to receive frame 55 from the host. Note also that sending station 2 has also updated its TOO—FAR value.

In FIG. 5B, at time $t_1$, the receiving station 20 has already passed frame 46 to its host; has received a response frame for the HOLE at frame 48; has detected new HOLES at frames 51 and 52; and has properly received frame 53. Note also that it has incremented its TOO—FAR value. In connection with the two new HOLES, the read processing section 42 of the receiving station 20 queues a selective reject command in the express queue of the write processing function 26, and the write processing function 26 responds by sending out a supervisory frame which selectively rejects frames 51 though 52.

At time $t_2$ in FIG. 5A, sending station 2 has received acknowledgements for frames 47 and 48 and is waiting for acknowledgements starting from frame 49; has not sent out any new frames, as compared with $t_1$; and has not received any further frames from the host. Note that TOO—FAR has been advanced by two more frames.

At time $t_2$ in FIG. 5B, receiving station 4 has received an I frame response for frame 49; has passed frames 47 through 49 to the host; has not received any new frames; and has advanced its TOO—FAR value to Frame 178.

Referring to FIG. 4, the data flow processor associated with one of the stations is illustrated. It is to be understood that the data flow processors for the other stations in the system have a similar configuration and operation. It is also to be understood that the data flow processor can be implemented as a unit separate from the host computer or can be incorporated as a part of the host computer. As shown in FIG. 4, the data flow processor is broken out from the host computer.

Generally, the data flow processor performs a write processing function and a read processing function. The write processing function operates upon outbound path information units (PIU) from the host and forms the PIUs into frames. The read processing function provides inbound path information units (PIU) to the host that are constructed from information contained in frames received from the transmission link.

A typical frame is illustrated in FIG. 3 . The frame includes flag bits 28, an address 30 control field 32 which indicate the type of frame, the information itself 34, a frame check sequence 36, and a flag 38. Address 30 can be that of the station to which information is to be sent, that of the station sending a response, or a broadcast address.

The control field identifies the nature of the frame, for example, an information frame a supervisory frame, or an unnumbered frame. The control field also specifies the maximum sequence length, as well as identify the sequence number $N_S$ of the information being sent, if the frame is an information frame, and $N_R$, the sequence number plus 1 of the highest frame which has been successfully received.

After the frames are formed, the write processing function 26 passes these frames to a transmitter/receiver section 40 for transmission across the link.

With respect to the read processing function 42, inbound frames from the transmitter/receiver section 40 are evaluated: (1) to determine whether the frames are valid, (2) to derive information from the frames and the associated sequence number $N_S$ for the frame, (3) to derive the frame receipt acknowledgment sequence number $N_R$, (4) to determine whether any frames have been selectively rejected or whether there is a reject command; and (5) to initiate, maintain, and terminate the communications link.

The read processing function 42 and the write processing function 26 are interactive in that the write processing function 26 requires information in order to form outbound frames and the read processing function requires information to check the incoming frames. With respect to the write processing function 26, this information relates to frames to be acknowledged, frames which are to be selectively rejected, when to go into reject state, and frames to be retransmitted. With respect to the read processing function 42, this information includes the write processing protocol values of the next frame that the write function expects to send and the lowest unacknowledged frame.

The information provided by the read processing function 42 to the write processing function 26 takes on at least two contexts In the first context the information relates to frames which the write processing function 26 has transmitted to the distant receiving station 20. In this context, the read processing function 42 identifies the frames acknowledged by the distant receiving station as having been successfully received, identifies the frames selectively rejected by the distant receiving station, and identifies the frames rejected by the distant receiving station.

As such, the information passed from read processing function 42 to write processing function 26 are directed to the sliding of the transmit window of the write processing function and to queue notations of high priority frames that the write processing function must write. The read processing function 42 also updates the lowest unacknowledged sequence number in the transmit window of the write processing function 26. In response to this information the write processing function 26: (1) resends one or more frames in response to a selective reject, (2) resends a block of frames in response to a reject command, or (3) continues with its transmission of new frames in the absence of any selective rejects or block rejects.

In the second context, the read processing function 42 is receiving information frames transmitted from the distant transmitting/receiving station. Read processing function maintains a read window which is updated as frames are passed to the host. Write processing function 26 has access to the read window and inserts the appropriate $N_R$ into some outgoing frames to acknowledge to the distant station that frame $N_R-1$ has been successfully received and passed to the host. In response to a selective reject or reject command, write processing function 26 forms a supervisory type frame to instruct the distant station that a particular sequence number frame has not been successfully received.

Thus, where there is a bidirectional flow of information between a local station and a distant station, the information passed between the read processing function 42 and the write processing function 26 have two identities.

An information type frame and a supervisory type frame are provided in accordance with the present invention. In FIG. 3, the information, or I type frame, is indicated by a particular arrangement of data in control block 32. This arrangement is illustrated in box 44. The information type frame is used to transmit new information, or to retransmit information in response to a reject or selective reject command.

Conversely, a supervisory or S type frame is shown in FIG. 3 and bears reference designation 46. The supervisory type frame is used to send a reject, a selective reject, or a status message called a heartbeat, along with the designation of the frame which is being selectively rejected, or the first frame of the sequence which is being rejected A further type of frame called the unnumbered or U type frame is shown in FIG. 3, bearing reference numeral 48. The unnumbered type frame is used during system start up to exchange start up parameters and instructions, when system type errors are present, or when the system is being disconnected.

Referring more particularly to the I type control block 44, in the preferred embodiment of the present invention, an I type frame is indicated by a logic zero in the first bit of the control block 32. The next three bits are unused, the fifth bit called the poll/final bit is used to cause a break in the read program on the distant end, the sixth through eighth bits indicate the number of bits which are being used in the sequence numbering. With respect to this latter indication, the number of bits in the present example can vary from 4 to 32 bits. As shown in FIG. 3 and block 44, the sequence length indication will be followed by two blocks of data. Each block has a number of bits which is specified by the sequence length indication. The first block provides the sequence number $N_S$ which identifies sequence number of the information being sent. The second block is $N_R$ the sequence number, plus one, of the last frame which has been successfully received and passed to the host processor. It is to be noted that, in accordance with the preferred embodiment of the present invention, a frame will not be acknowledged as having been received, even though it was successfully received, until it has been passed to the host. A frame will not be passed to the host unless all previous frames have been passed to the host. When a HOLE is present in the received sequence the frames which have been successfully received, but which have sequence numbers that follow the sequence number for the HOLE, will not be passed to the host until the HOLE is filled.

When the I type frame is a response frame, i.e. a response pertaining to a selectively rejected or a rejected frame, the address field 30 bears the address of the station which is retransmitting the frame.

An S type frame is identified by a logic 1 in the first bit and a logic 0 in the second bit of the control block. The logical value of bits 3 and 4 of the control block indicate whether the transmitting/receiving station from which the frame was sent: (1) is sending a heart beat (0,0); (2) is rejecting a sequence of frames starting at the indicating sequence number (0,1); or (3) is selectively rejecting the frame for the indicated sequence number (1,1). As shown in FIG. 3, block 46, bit 5 and bits 6 and 7 have the same function as in the I type frame. The $N_S$ block indicates the sequence number of the next frame to be sent by the transmitting/receiving station which originated the supervisory frame. The $N_R$ block in a heart beat is the sequence number plus 1 of the highest frame successfully received by the transmitting/receiving station. Where a reject condition is indicated, the $N_R$ block indicates the starting sequence number of the frames which are being rejected. Where a selective reject condition is indicated, the $N_r$ block indicates the sequence number of the frame which is being selectively rejected and which is to be retransmitted. In the preferred embodiment of the present invention, a sequence number range is specified, with the $N_R$ field representing the lower end of the range and the $N_S$ field representing the upper end of the range.

All I type frames and some U type frames have information fields that are used to transmit messages. In FIG. 18, the I type information field bears reference numeral 50, while the U type information field bears reference numeral 52. U type information fields are used to manage link activities such as link initiation or disconnect. The U type information fields and the I type information fields can have the same format. I type frame information fields are used to hold the path information units (message) presented by the host. The maximum length of the information field is set by the user and need not have any relationship to the length of the messages to be sent.

The information field within a given frame can contain a portion of a message, or one or more complete messages. Within the information fields, a control area is placed at the start of each message segment contained within the frame. A message segment is defined to be either a complete message that fits in the current frame, or the portion of a message which requires several frames to accommodate all of the information. In block 50, two control areas 54 and 56 are shown. Each control area includes a message flag which indicates whether the message segment is an entire message or a portion of a larger message, and a message length designation to indicate how long the following segment of information will be. Where two or more messages or a complete message and a portion of another message can fit within an information field of a frame, additional control areas, such as control area 56, will be present in the field. However, where only a single message can fit within the field, only control area 54 will be present.

In relation to prior methods for implementing satellite communication systems, error recovery methods called "Go-Back-n" are used which dictate that a frame received in error or a missing frame sequence number will be rejected by the receiver. All frames that follow the rejected sequence number are discarded by the receiver until the good copy of the rejected frame has been received. Thereafter, frames following receipt of the good copy of the rejected frame will be accepted by the receiver. Rejection will always cause the transmitter to begin retransmitting frames starting at the rejected frame sequence number.

In the present invention, a selective repeat technique is used. With this technique, the receiver only rejects the missing or error frames. Frames that are received in good condition are kept and stored.

The use of this technique avoids costly retransmission of frames and results in dramatic improvements in link efficiency. In the implementation of this technique, a different method, from prior techniques of managing sequence numbers, is used. This method involves the use of a valid sequence number range, called a window. See FIGS. 5A and 5B.

A window is a range of sequence numbers wherein only the sequence numbers falling within the range can be processed by the receiving/transmitting station at any given time. In the preferred embodiment of the present invention, the window size is equal to the maximum sequence number selected plus 1, divided by 2. As described in an earlier section of this disclosure, this sequence number is selected by the user and dictates the number of frames which can be outstanding at any one time between acknowledgements. The window size is the same for both the sender and the receiver for transmission of information in any given direction across the transmission link and is preferably never greater than the window size defined above. In the preferred embodiment of the present invention, the temporary storage areas 27 and 43 need be only large enough to hold all of the frames in the specified window. As frames are sent and/or received, the window slides through the range of sequence numbers and has a location, at any time, which is dependent upon the particular frames which have been sent, received, rejected or selectively rejected. See FIGS. 5A and 5B.

As discussed briefly above, the present invention will be described in terms of a general purpose digital computer under control of a series of instructions. However, it is to be understood that the present invention can be implemented by way of a separate arrangement of an intelligent controller and data storage areas.

Referring more particularly to FIG. 4, the preferred embodiment of the present invention will now be described in greater detail FIG. 4 is intended to illustrate the flow of information between the link and the host computer by way of the data flow processor 20 of the present invention. At the righthand side of FIG. 4, a communications processor 40 is illustrated. Such a processor includes a line adapter 41, a data buffer 43, and a channel adapter 45.

The communications processor 40 is intended to provide an interface between a data channel, such as from a host computer, and a communications link, such as a satellite link. Thus, when data is being transmitted by the host, the channel adapter section 45 of communications processor 40 transforms the data received from a host, on the host channel, into a form suitable for handling by the line adapter 41. This transformed data is stored temporarily in data buffer 43. Line adapter 41, in turn, transforms the data stored in data buffer 43 into a form which can be placed on the communications line 16. Similarly, when data is being received from the communications link 16, line adapter 41 transforms the data into a form which is understandable by channel adapter 45. This transformed data is stored temporarily in data buffer 43. Channel adapter 45 thereafter converts the data in data buffer 43 into a form which can be understood by the equipment attached to the host channel.

As part of its receive state operation, the communications processor provides, as a part of the information provided to the channel, frame status information which indicate whether the communications processor 40 detected errors in the data due to problems with the communications link 16 or the communications processor 40 itself.

At the left of FIG. 4, a host computer 18 is shown. It is to be understood that host computer 18 can also be a data source or data sink.

The data flow processor 20 of the present invention is shown in FIG. 4 enclosed within a dashed line. The data flow processor 20 receives inbound frames from communication processor 40, processes these frames, and passes the appropriate information from these frames to host 18.

Similarly, host 18 provides information to data flow processor 20 for transmission on the communications link 16. Data flow processor 20 assembles this information into appropriately formatted frames and passes these frames to communication processor 40 for transfer to the communications link 16.

As illustrated in FIG. 4, data flow processor 20, in its preferred embodiment, is implemented within the host computer under control of a series of instructions. The blocks shown in FIG. 4 define the storage areas utilized by the data flow processor, it being understood that the writing of data into or reading of data out of any of the specified storage areas is performed by the host under control of the series of instructions. These instructions will be described in greater detail in connection with FIGS. 6 through 17.

Referring more specifically to the data flow processor 20 of FIG. 4, it can be seen that the read processing function 42 utilizes four storage areas. Inbound frames from the communications processor 40 are initially stored in FIO buffer 100. Selected portions are extracted from the frame stored in FIO buffer 100 and placed into a frame element area, FEA 102. The portions which are stored in FEA 102 include the control field of the frame, the sequence numbers, and the frame status information.

A frame control table (FCT) 104 is provided which lists the bit patterns for the possible types of frames, i.e., commands, responses, initialization, etc., which can be exchanged along the communications link. The read processing function 42 utilizes the information stored in the FIO 100, the FEA 102, and the FCT 104 to identify the information contained in the frame and to place that information into the frame storage area 106 in proper position relative to other frames which have been received. Frame storage 106 then provides the frames of information to the host 18.

In connection with the read processing function 42, the inbound frames of information are checked to determine: (1) whether they represent a new frame of information, (2) whether the frame of information was sent in response to a reject or selective reject command, (3) the absence of frames which should have been received in light of the sequence number of frames which already have been received, or (4) whether the frame is a request from the sending station for a retransmission of certain frames of information.

With respect to situations three and four, read processing function 42 will place an appropriate instruction in express que 108 for implementation by write processing function 26. Where the number of missing frames exceeds a predetermined amount, a reject command, REJC, will be queued in the express que 108. Where fewer than the predetermined amount are missing, a selective reject command will be queued in the express que 108. Where a request for retransmission of frames is received, read processing function 42 will queue an I frame response, IFRR, in express que 108.

When read processing function 42 places selective reject commands in the express que, it also initiates a selective reject timer associated with selective reject time-out area 110. Read processing function 42 maintains a record of the status of each frame of the frame sequence being exchanged and maintains this status information in the selective reject time-out area 110. Thus, the selective reject time-out area, SRTA, includes a timing function for each selectively rejected frame, and a "received" indication for frames which have been received successfully.

Similarly, write processing function 26 has a frame storage area 112, a frame command table 114, a frame element area 116, and a frame input/output buffer 118. Frame storage area 112 receives information from host 18 for transmission. Write processing function 26 is responsive to the information in frame storage 112 and to the commands in express que 108 and assembles frames into the FIO buffer 118 for supply to the communication processor 40. Write processing function 46 first processes the instructions in express que 108 and, thereafter, processes the information in frame storage 112. Write processing function 26 accesses the FEA 116 and the FCT 114 to obtain information for incorporation into the frames.

Generally, the data flow processor 20 has a number of states: (1) a link state in either an IS mode or an IT mode; (2) a transmit state in either a slow-down or IT mode, or (3) a receive state in either a reject or IT mode. As used above, the IS mode occurs during the initialization of the communications link. In the IS mode, there are a number of IS substates which involve the orderly progression of the communications link from no communication to active communication.

The IT mode referred to above involves the transfer of information in the form of commands and responses. Thus, when the data flow processor is in the receive state, IT mode, it is receiving commands or responses from the remote station directed to the information being transferred from the remote station. When the data flow processor is in the transmit state, IT mode, it is transmitting commands or responses directed to the information that it is transferring across the link.

When the data flow processor 42 is in the receive state, reject mode, read processing function 42 can process only reject responses from the remote station. All other frame types, such as I frame commands, are ignored.

When the data flow processor 20 is in a transmit state, slow-down mode, write processing function 26 can process only instructions from the express que 108. In the slow-down mode, the data flow processor 20 has determined that there is already a maximum number of frames outstanding on the communications link and, therefore, no new frames of information ought to be transmitted. Thus, only frames which relate to previously transmitted and outstanding frames can be transmitted.

Detailed Read Processing

Figure 6:
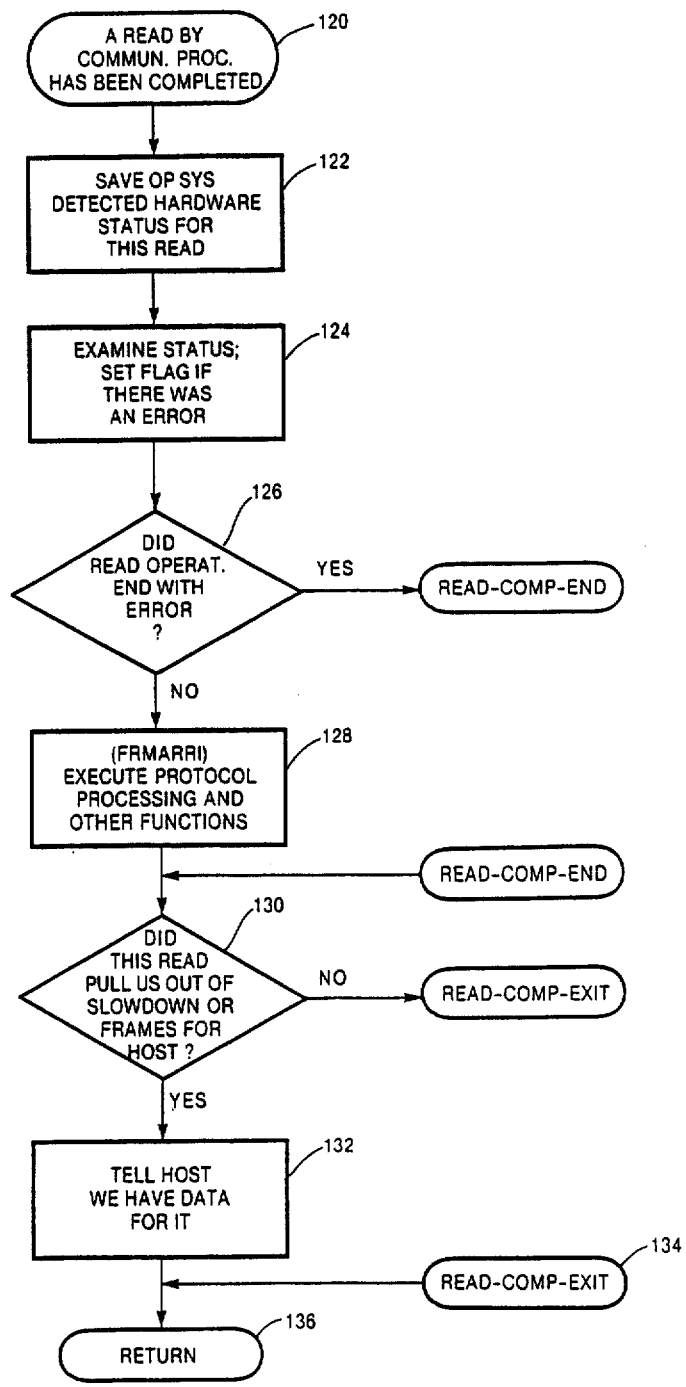
FIG. 6 provides a generalized flow diagram of read processing function.

Referring more particularly to FIGS. 6 through 12, the read processing function 42 will now be described in greater detail. FIG. 6 describes, in general terms, a sequence of operations for obtaining inbound frames from communications processor 40, processing these frames in read processing function 42, and passing the processed frames to host 18. Certain of the operations described in FIG. 6 will be described in further detail in connection with FIGS. 7 through 12.

The following description will be better understood if reference is also made to FIG. 4. The read processing function 42 begins at step 120. At this point, a read has been completed by the communication processor 40. This means that the communication processor 40 has received frames from the communications link 16 and has written these inbound frames into FIO buffer 100. Step 120 detects the fact that such a read has been completed. In steps 122 and 124, read processing function 42 saves any indications of hardware errors detected by the system during the read operation by communication processor 40. In step 124, appropriate flags are set to indicate the existence of hardware errors. By hardware errors, it is meant errors which arise from the malfunctioning of the various equipment connected in the communications path. This includes malfunctions of the communications processor 40.

In step 126, if no such hardware errors are detected, step 128 is executed wherein the frames are evaluated and the protocol of the present invention implemented. Step 128 will hereafter be identified as FRMARRI step 128. If, on the other hand, it is determined in step 126 that the read operation ended in a hardware error, FRMARRI step 128 is bypassed. Thereafter, step 130 is executed in which it is determined whether the current read has pulled the system out of "slow-down" mode, or whether frames are available for the host. Recall that the data flow processor enters a "slow-down" mode whenever it determines that the maximum permitted number of frames are outstanding on the communications link; in other words, the link is full. The data flow processor 20 will exit the "slow-down" mode when it receives acknowledgments of frames received by the remote station which acknowledgments indicate that there are now fewer than the maximum permitted number of frames outstanding on the communications link.

If it is determined that the link is still full, or that no frames are available for the host, read processing function 26 will proceed to step 134 and return control via step 136 to host 18. If, on the other hand, frames for the host have been obtained, step 132 will be executed to tell the host that data is available for it. Thereafter, steps 134 and 136 will be executed to return control to the host.

Figure 7:
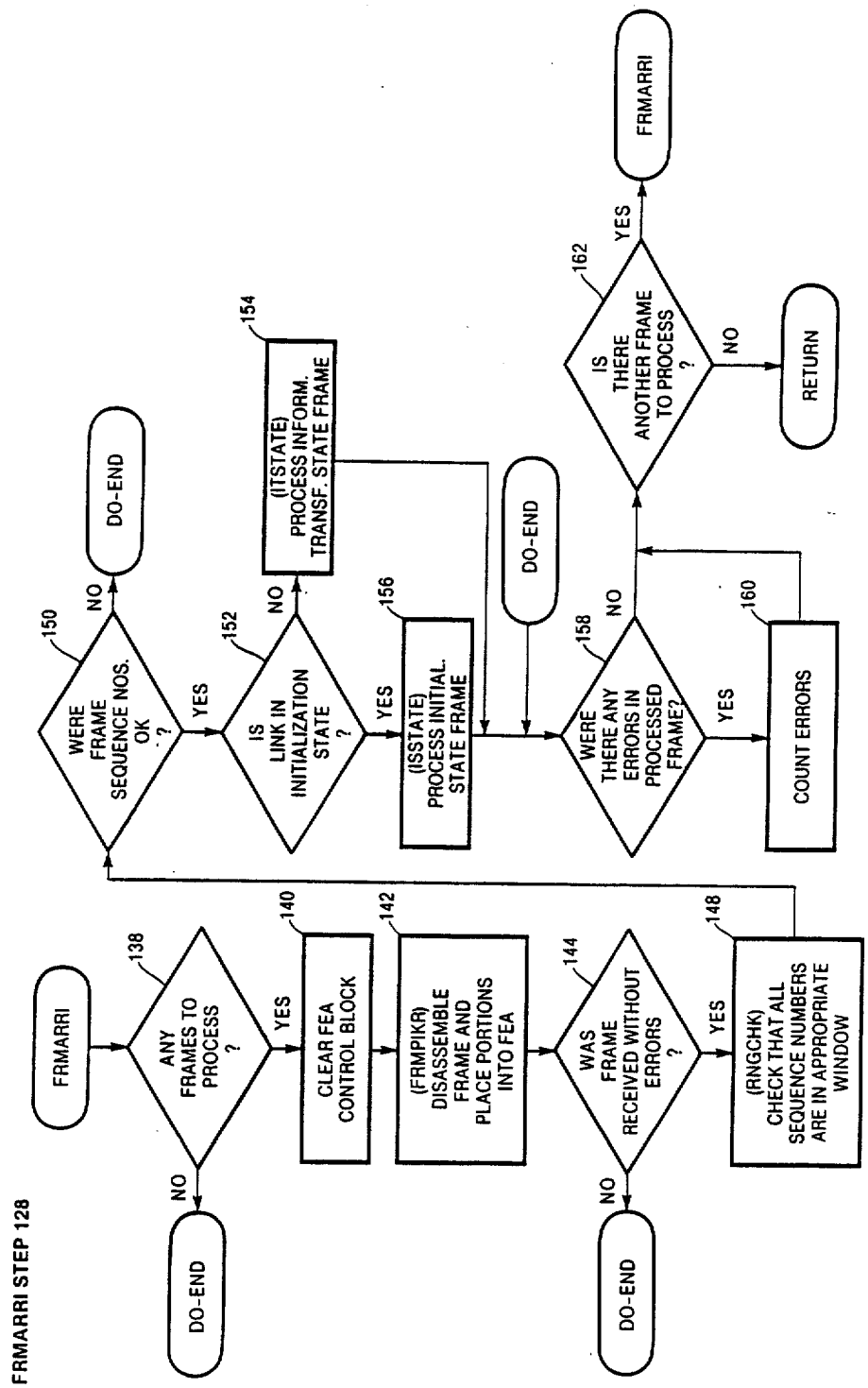
FIG. 7 provides a detailed flow diagram of FRMARRI step 128 of FIG. 6.

Referring now more particularly to FIG. 7, FRMARRI step 128 will be described in greater detail. In step 138, FIO buffer 100 is examined to determine whether there are any frames to process. If not, the system jumps to $DO_{13}$ END at step 158. If, on the other hand, there are frames in FIO 100 to process, FEA 102 is cleared. See step 140. A frame is then selected from FIO buffer 100 and disassembled in step 142. Additionally, in this step, portions of the frame are placed in FEA 102 These portions include the control field, including the sequence numbers, sequence link, and frame type information. Additionally, the address field of the frame and the frame status information from the communication processor 40 are stored in FEA 102. The remainder of the frame is left in FIO buffer 100.

Thereafter, step 144 is executed in which it is determined whether the frame was received without errors. These are the errors detected by the communication processor 40 and include errors caused by problems on the communications link or those within the communication processor 40 itself. If errors were detected, the system proceeds to DO_END and step 158. If the frame was received without errors, step 148 is executed in which the sequence numbers are checked to determine whether they are within the appropriate ranges. Hereinafter, step 148 will be referred to as RNGCHK step 148.

In step 150, the results of RNGCHK step 148 are checked for any out-of-range conditions. If the frame sequence numbers were out-of-range, the system proceeds to DO_END in step 158. In other words, a frame with an out-of-range sequence number is ignored. If, on the other hand, the sequence number was within range, step 152 is executed in which it is determined whether the system is in a link initialization state. Recall that when data flow processor 20 is in a link initialization state only link commands and responses can be processed. If such is the case, step 156 is executed wherein various link parameters are exchanged between the local host and the remote host. In turn, these parameters are examined by each station and a compromise set of parameters are agreed upon under which active communication is to occur.

If, on the other hand, data flow processor 20 is not in the link initialization state, step 154 is executed. Step 154, hereinafter, will be called ITSTATE step 154. In this step, information transfer state frames are processed. This includes the examination of the frame to determine whether it corresponds to a reject response, an I frame command, an I frame response, a reject command, a selective reject command, an unnumbered command, or a request that the system enter a initialization state. ITSTATE step 154 will be described in detail in the following material.

After ITSTATE step 154 or ISSTATE step 156 is processed, read processing function 42 proceeds to step 158. In this step, a check is made for any errors in the processing of the frame. If such errors did occur, step 160 is executed to count them by type. If no errors were detected, step 162 is processed in which a check is made of the FIO 100 for any other frames to be processed. If there are more frames in FIO 100, read processing function 42 returns to step 138 to process the additional frames. If, on the other hand, no additional frames are found in the FIO, read processing function 42 returns to step 130 in FIG. 6.

Figures 8, 9:
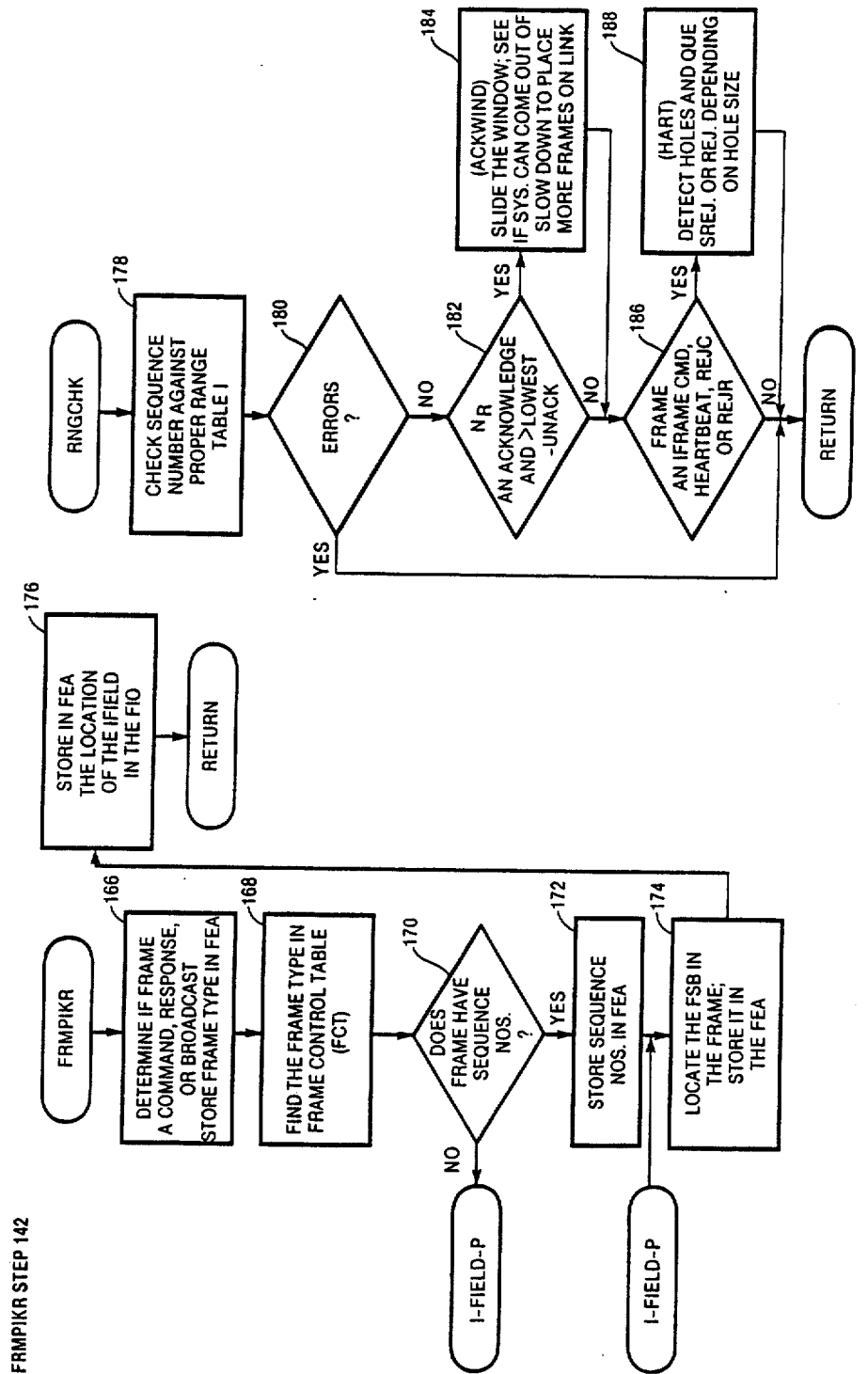
FIG. 8 provides a detailed flow diagram of FRMPIKR step 142 of FIG. 7.
FIG. 9 provides a detailed flow diagram of RNGCHK step 148 of FIG. 7.

Referring now to FIG. 8, FRMPIKR step 142 of FIG. 7 will now be described in greater detail. Recall that FRMPIKR step 142 disassembles the frame and places portions of the disassembled frame into the FEA 102. Step 166 is first executed to determine if the frame is a command, a response or a broadcast. Earlier in the discussion in connection with FIG. 3, it was stated that a command is indicated if the address field of the frame contains the address of the local receiving station. On the other hand, a response is indicated if the address field contains the address of the remote sending station. A broadcast is indicated if the address field contains all ones. The frame type indication is thereafter stored in FEA 102.

Thereafter, step 168 is executed in which the frame type is located in the FCT 104. In step 170, the control field of the frame is examined to determine whether it contains sequence numbers. If such is the case, step 172 is executed in which the sequence numbers are stored in FEA 102. If, on the other hand, there are no sequence numbers in the control field, step 174 is executed in which the frame status information, FSB, is located in the frame and then stored in FEA 102. Finally, in step 176, the location of the information field, IFIELD, in the FIO buffer 100 is stored in FEA 102. Thus, it can be seen that, upon completion of FRMPIKR step 142, FEA will contain an indication of the frame type, any sequence numbers contained therein, the frame status information, and the location of any information field in the FIO buffer 100.

Referring now more particularly to FIG. 9, RNGCHK step 148 of FIG. 7 will now be described in greater detail. Recall that in this step, the sequence numbers extracted from the frames are checked to determine whether they are within the appropriate ranges. In step 178, the sequence number for the particular frame being processed is checked to determine whether it is within a given range according to the type of frame to which the sequence number corresponds. These ranges are provided in Table I.

TABLE I

| FRAME TYPE | SEQ. NO. | TEST |
|---|---|---|
| FCT_NSUBR = ACK | $N_R$ | . GE. LOWEST_UNACKED AND . LE. NEXT_TO_SEND |
| FCT_NAME = REJR | $N_R$ | = CMD_EXPECTED |
| FCT_NSUBR = QUE (SREJ) | $N_R$ | . GE. LOWEST_UNACKED AND . LT. NEXT_TO_SEND |
| FCT_NSUBR = QUE | $N_R$ | . GE. LOWEST_UNACKED |

TABLE I-continued

| FRAME TYPE | SEQ. NO. | TEST |
|---|---|---|
| (REJC) | | AND |
| | | . LE. NEXT_TO_SEND |
| FCT_NSUBS = QUE | $N_S$ | . GE. RESP_EXPECTED |
| (IFRR ONLY N(S)) | | AND |
| | | . LT. CMD_EXPECTED |
| FCT_NSUBS = NSUBS | $N_S$ | . GE. CMD_EXPECTED |
| (IFRC) | | AND |
| | | . LT. REC_TOO_FAR |
| FCT_NSUBS = NSUBS | $N_S$ | . GE. CMD_EXPECTED |
| (SREC, HARC, REJC, REJR) | | AND |
| | | . LE. REC_TOO_FAR |

In step 180, if the sequence number is detected as being out-of-range, an error is indicated and the system returns to step 150 of FIG. 7. If, on the other hand, the sequence numbers for the frame are in range, step 182 is executed to determine whether the sequence number includes a received sequence number, whether $N_R$ is an acknowledgment and, also, whether that received sequence number is greater than the lowest unacknowledged sequence number. If such is the case, step 184 is executed to slide the receive window and to determine whether the system can come out of "slow-down"; i.e., whether the system can place more frames on the link. Hereinafter, step 184 will be referred to as ACK_WIND step 184.

If, on the other hand, the answers to the inquiries in step 182 are "no", or after step 184 has been executed, the frame is checked in step 186 to determine whether it is an I frame command, a heart beat, a reject command, or a reject response. If it is not, the system returns to step 150 of FIG. 7; otherwise, step 188 is executed, hereinafter referred to as HART step 188. In this step, the sequence numbers of the current frame are compared to that for the next information frame expected. If they are not the same, a hole may be indicated in the series of frames being received. If a hole is detected, a selective reject command or a reject command is queued in the express que 108, depending upon the size of the hole. After execution of HART step 188, the system returns to step 150 of FIG. 7.

Figure 10:
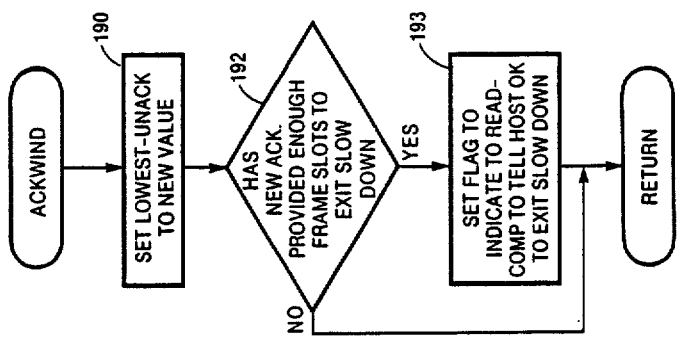
FIG. 10 provides a detailed flow diagram of ACKWIND step 184 of FIG. 9.

Referring more particularly to FIG. 10, ACK_WIND step 184 of FIG. 9 will now be described in greater detail. Recall that ACK_WIND step 184 slides the receive window and determines whether the system can come out of "slow-down". In step 190, because it has been determined that an acknowledgment has been received, the LOWEST_UNACK value in the receive window is set to the $N_R$ of the frame being processed. In step 192, a check is made to determine whether the new acknowledgment will permit the freeing-up of enough frame slots to permit the system to exit "slow-down". The exit "slow-down" value is one of the parameters agreed upon by the host computers at each end of the communications link during the link initialization sequence.

If, in step 192, it is determined that "slow-down" can be exited, step 193 is processed in which a flag is set to indicate to the system that the host can now be told to exit "slow-down".

If, in step 192, "slow-down" cannot be exited, the system returns to step 186 of FIG. 9.

Figure 11:
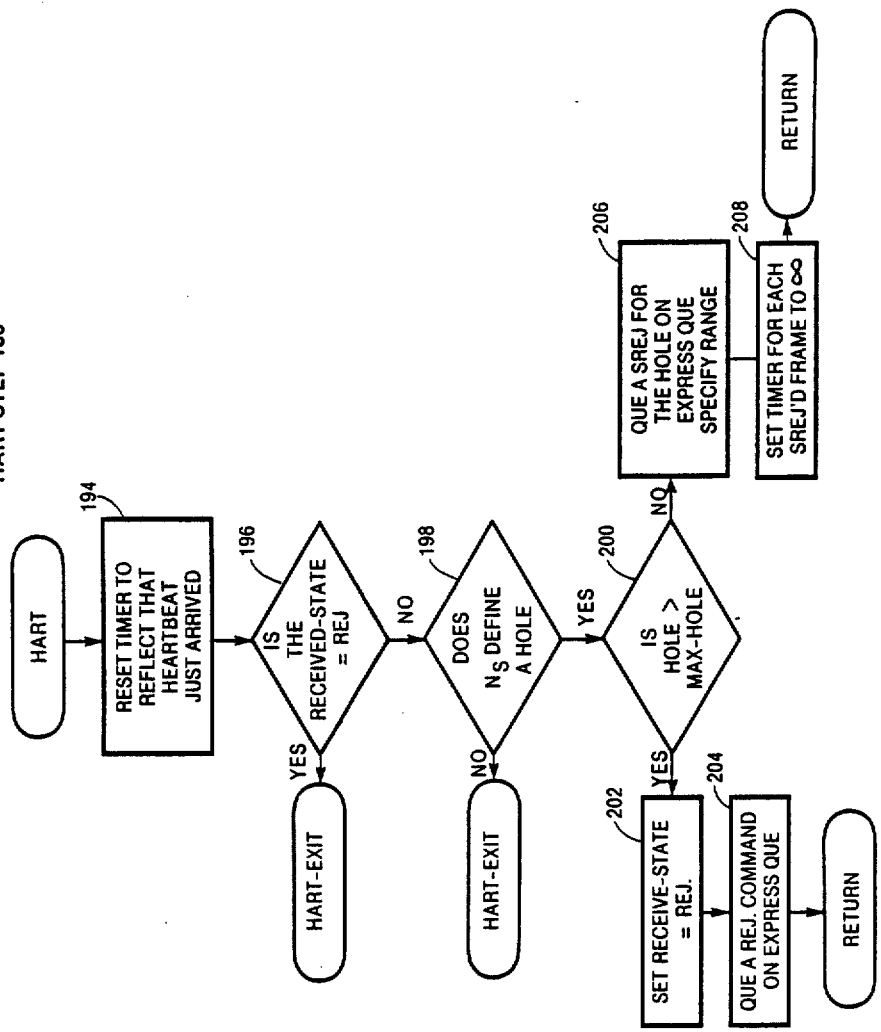
FIG. 11 provides a detailed flow diagram of HART step 188 of FIG. 9.

Referring more particularly to FIG. 11, HART step 188 of FIG. 9 will now be described in greater detail. Recall that HART step 188 detects holes in the number sequence and queues selective reject or reject commands in the express que 108, depending upon the detected hole size. More specifically, HART step 188 first resets the heartbeat timer in step 104 to reflect that a heartbeat, or some other communication from the remote station, has just arrived. The heartbeat timer is a timer maintained by the system which requeues a heartbeat instruction in the express que 108 to be sent by the write processing function 26 when the heartbeat timer times out. Timing out of the heartbeat timer can indicate that there is a low traffic condition on the link, and that a heartbeat frame is required to keep the remote station informed that the local station is active.

Step 196 is next executed to determine whether the system is in a receive state reject mode. If such is the case, the system exits from- HART step 188. Recall that when the receive state is in the reject mode, only reject responses are to be processed by read processing function 42.

If, on the other hand in step 196, it is determined that a system is not in a receive state reject mode, step 198 is executed Here, the send sequence number, $N_S$ is examined to determine whether a hole is indicated. A hole is indicated when the $N_S$ for the current frame being examined is greater than the command expected by read processing function 42. If no hole is defined, the system exits from HART step 188. If, on the other hand, a hole is found, step 200 is executed in which the size of the hole is examined to determine whether it is greater than the user-defined MAX_HOLE. If the hole is larger than MAX_HOLE step 202 is executed in which the system is set into a receive state reject mode. Thereafter, in step 204, read processing function 42 queues a reject command on the express que 108. Thereafter, the system returns out of HART step 188.

If, on the other hand, in step 200, the quantity MAX_HOLE is not exceeded, selective reject commands, SREJC, are queued on the express que 108 for all missing sequence numbers within the hole. This can be done by queueing selective reject commands for each of the missing sequence numbers or, preferably, by queueing a selective reject command which specifies a range of missing sequence numbers.

Upon completion of step 206, step 208 is executed in which a selective reject timer is set in the SRTA 110 for each of the selectively rejected frames. In the preferred embodiment of the present invention, the timer value is set to be infinity at this point. When the selective reject frame is actually transmitted by write processing function 26, the timer for each of the frames is set to the desired selective reject timer value. The timer value can be set by: TIME=SREJ_INTERVAL+(NO._SREJ_OUTSTANDING/FRAME_FACTOR)+CURRENT_TIME. FRAME_FACTOR is related to link speed.

After execution of step 208, the system exits out of HART step 188 in FIG. 9.

Figure 12A:
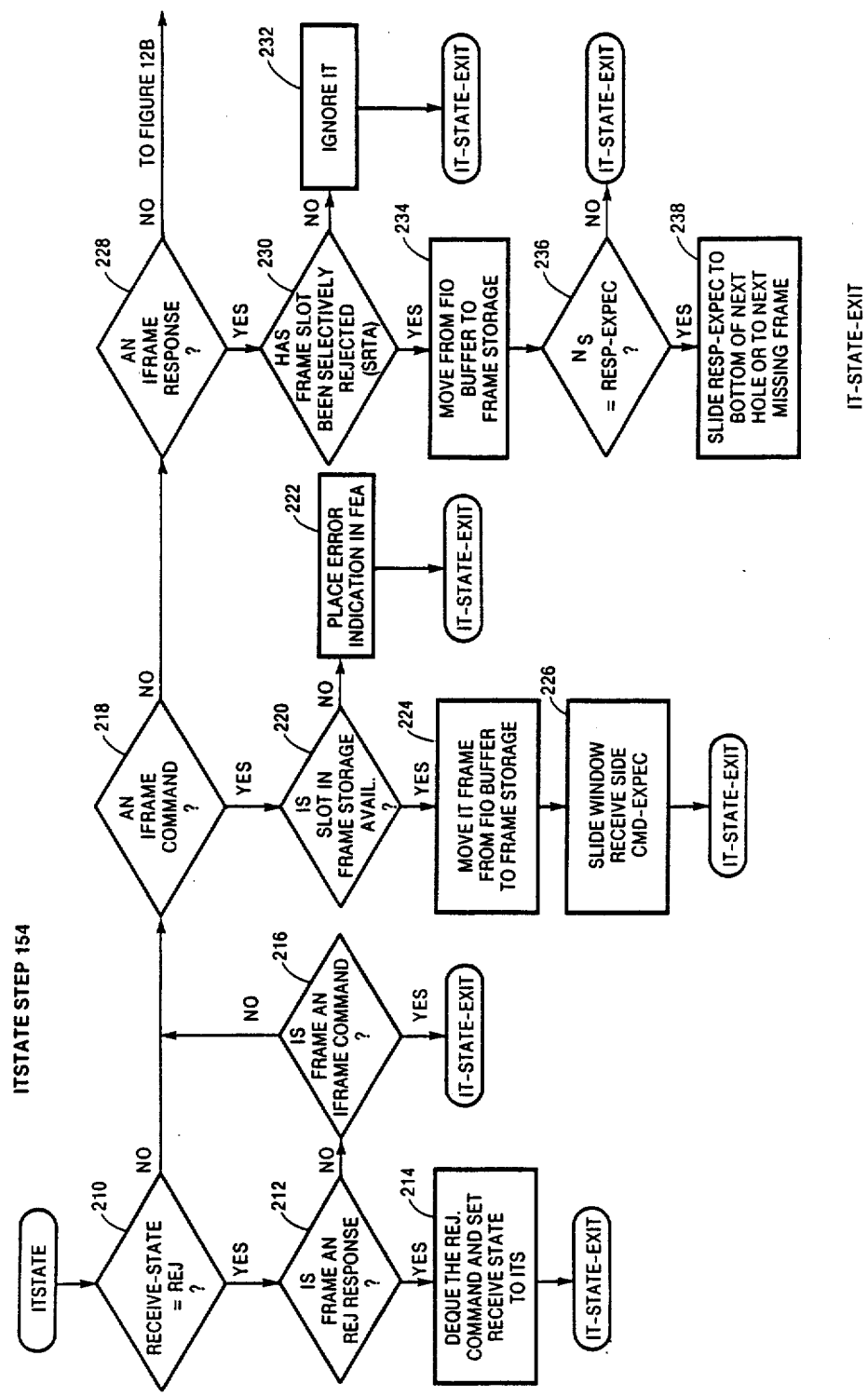
FIG. 12A and 12B provide a detailed flow diagram of ITSTATE step 154 of FIG. 7.
Figure 12B:
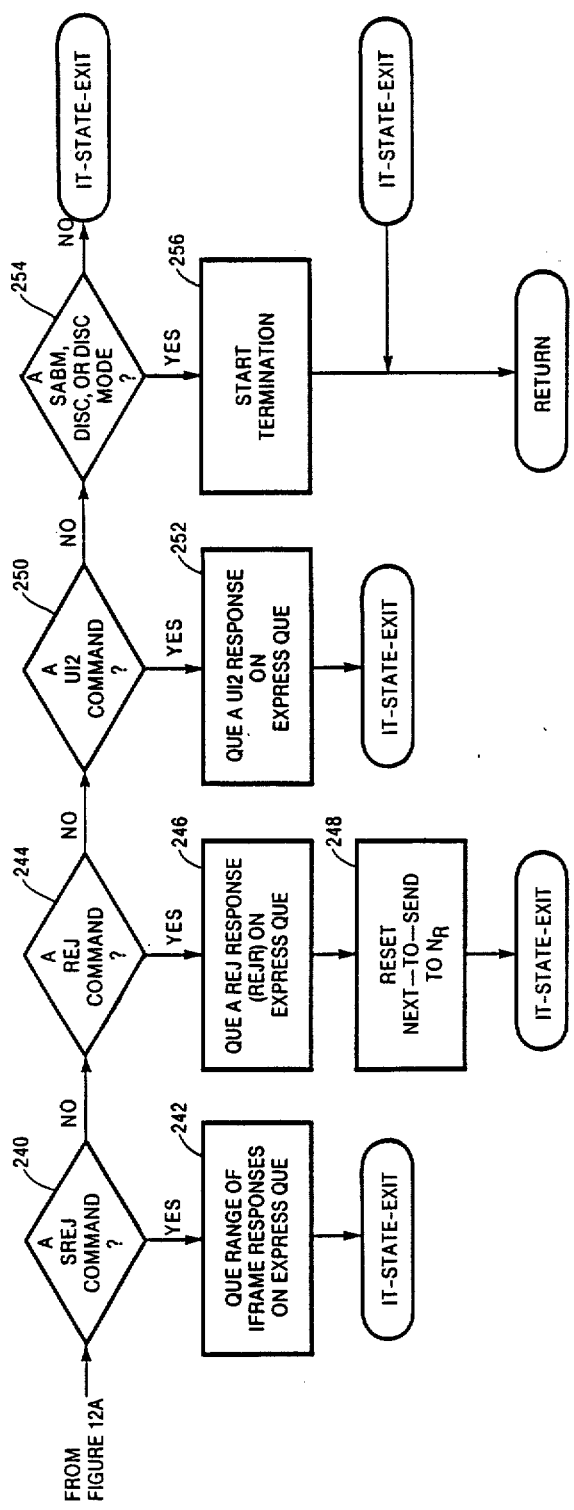

Recall that in FIG. 7, an ITSTATE step 154 is executed in which the information transfer state frames are processed. Referring now more particularly to FIG. 12, ITSTATE step 154 will now be described in greater detail. In step 210, the receive state of the data flow processor 20 is first examined to determine whether it is in the reject mode. As indicated above, when in the reject mode, only reject responses can be processed. If such is the case, step 212 is executed to determine whether the frame being processed is a reject response. If yes, the reject command that had previously been queued in the express que for the sequence number of the current frame is dequeued, and the receive state of data flow processor 20 is set to an information transfer state, ITS, in step 214.

If, on the other hand, in step 212, the current frame is not a reject response, REJR, step 216 is processed to determine whether the frame is an I frame command. Recall that a reject response is indicated by a sending station when the sending station places its own address in the address field of the frame being sent, a determination is made as to whether the frame is a rejected frame by comparing the sequence number $N_S$ of the frame being processed to the response expected value in the receive window.

In step 216, if it is determined that the frame is in I frame command, the system exits the ITSTATE step 154. This is because when the system is in the receive state reject mode, only reject responses will be processed. If, on the other hand, in step 216, it is determined that the frame is not in I frame command, the system continues processing the frame as if data flow processor 20 were not in a receive state reject mode.

In such case, step 218 is executed to determine whether the frame is an I frame command. Step 218 is executed when the result is negative in step 210 or in step 216. If the frame is not an I frame command, step 228 is executed to determine whether the frame is an I frame response.

If, instead, the frame is an I frame command, step 220 is executed to determine whether a lot is available in frame storage 106 for storing information from the current frame. If not, step 222 is executed to place an error indication in the frame element area buffer 102 and thence to exit from the ITSTATE step 154.

If, on the other hand, space is available in frame storage 106, step 224 is processed to move the frame from the FIO buffer to the frame storage 106. Thereafter, in step 226, the receive window is updated. More specifically, the COMMAND_EXPECTED value is updated to a sequence number which is one greater than the sequence number $N_S$ for the frame just placed into frame storage 106. Thereafter, the read processing function 42 exits from ITSTATE step 154.

If the current frame is not an I frame command, step 218, and is an I frame response, step 228, the SRTA is examined to determine whether the frame slot, or sequence number has been rejected. See step 230. Recall that the SRTA 110 maintains a status flag for each of the frame in the frame sequence. Thus, the flag for the appropriate sequence number is examined to determine whether the flag indicates that the frame corresponding to that sequence number has been selectively rejected.

If the flag indicates that the frame has not been selectively rejected, step 232 is executed to ignore the frame. This condition can occur when the frame had originally been designated as selectively rejected, and the selective reject timer for the frame times out without receipt by read processing function 42 of an I frame response for that frame. Under such conditions, the selective reject command for that frame will be requeued in the express que 108 and a selective reject command re-sent to the remote station. However, it is possible that, during this requeueing and re-sending of the selective reject command, an I frame response was, in fact, enroute over the communications link to the local station. This I frame response then will be received by the read processing function 42, the flag for the frame sequence number $N_S$ in the SRTA 110 will be changed to a received state, and the selective reject command will be dequeued from the express que 108, all while the re-sent selective reject command is enroute to the remote station. If and when a duplicate I frame response is sent by the remote station, steps 230 and 232 will permit the read processing function 42 to ignore the frame.

If in step 230, it is determined that the frame has been selectively rejected, as specified by the corresponding flag in the SRTA 110, step 234 is executed to move the frame from the FIO buffer 100 to frame storage 106. Thereafter, in step 236, the send sequence number for the frame, $N_S$ is examined to determined whether it is equal to the response expected. If it is not equal, ITSTATE step 154 is exited. If $N_S$ is equal to RESP_EXPECTED, step 238 is executed to increment the value for RESP_EXPECTED to the bottom of the next hole or to the next missing frame of send sequence number $N_S$. Thereafter, ITSTATE step 154 is exited.

In step 228, if it is determined that the frame is not an I frame response, the frame is then examined to determine if it is a selective reject command. See step 240. Here, a selective reject command would be a communication from the remote station instructing the local station to retransmit certain frames. The selective reject command will specify, preferably, a range of selectively rejected send sequence numbers, $N_S$. In step 242, an I frame response command will be queued on express que 108 and the range of send sequence numbers $N_S$ will be specified. Thereafter, the ITSTATE step 154 will be exited.

If in step 240, it is determined that the frame was not a selective reject command, step 244 is then executed to determine whether the frame represents a reject command. When a reject command is sent by the remote station, this indicates to the local station that all frames starting with and following the indicated receive sequence number $N_R$ are rejected, and that the local station should retransmit all frames starting with the indicated receive sequence number $N_R$. If such is the case, a reject response instruction will be queued on express que 108 in step 146. Then, in step 248, the NEXT_TO_SEND is reset to correspond to the receive sequence number $N_R$ of the current frame. Thereafter, ITSTATE step 154 is exited.

If, in step 244, it is determined that the frame is not a reject command frame, step 250 is executed to determine whether the frame corresponds to an unnumbered initialization frame. An unnumbered initialization frame command can be present at this point where the remote station had previously sent an unnumbered initialization frame command but where the local station did not receive such command. If in step 250 the unnumbered initialization frame command is detected, step 252 is executed to queue a numbered command response on express que 108. Thereafter, ITSTATE step 154 is exited.

If, in step 250, the frame is not a unnumbered initialization frame command, step 254 is executed to determine whether the frame is a communications initiation type command (SABM), a disconnect command, or a disconnect mode command. If none of these commands are present, the ITSTATE step 154 is exited. If any one of the above three commands are detected, step 256 is executed to begin termination of the current read operation. A SABM command can be received at this point where the remote station had previously been shut down without the local station having detected it.

Detailed Write Processing Function 26

Figure 13:
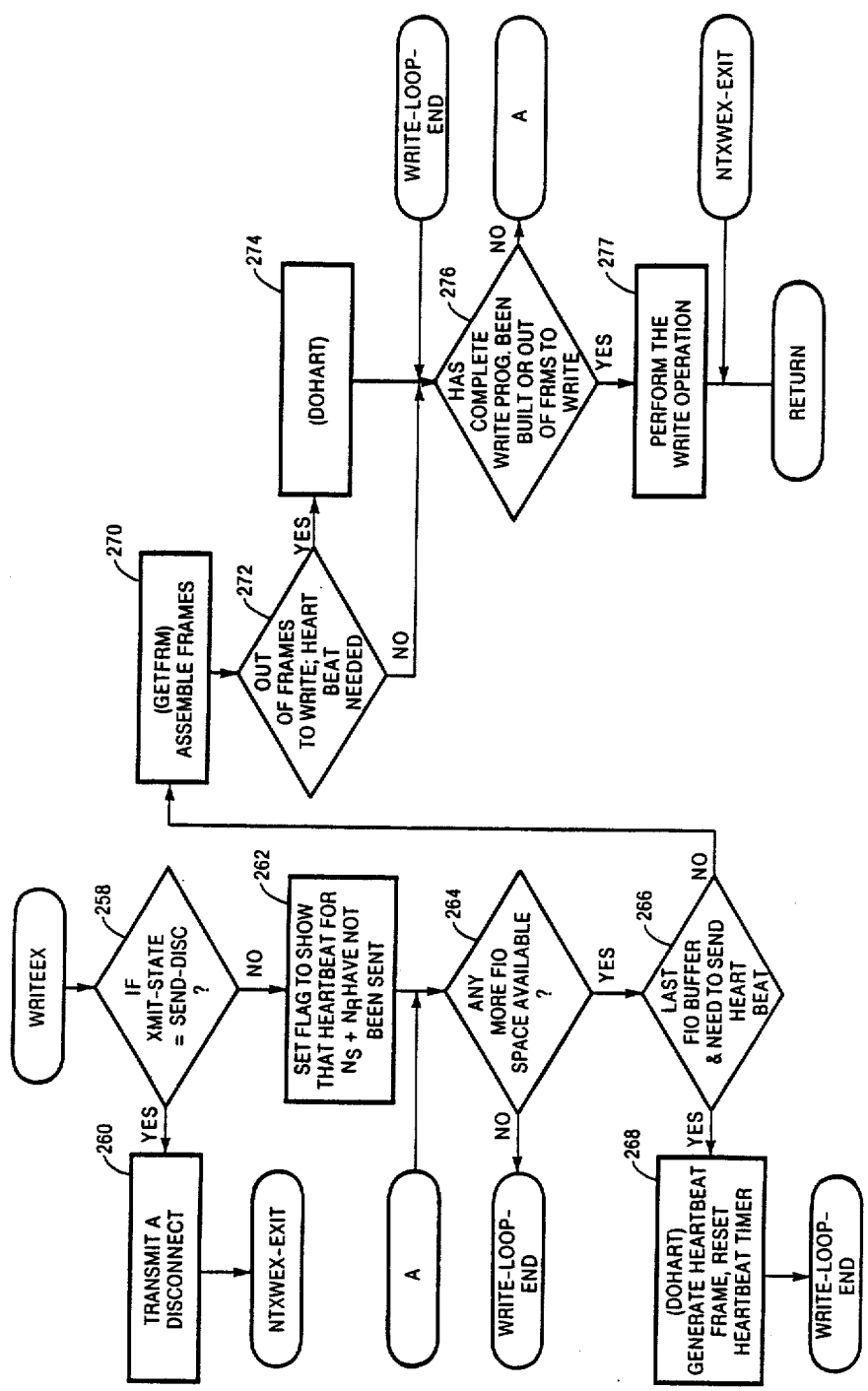
FIG. 13 provides a generalized flow diagram of the write processing function in accordance with the present invention.

Referring now more particularly to FIG. 13, write processing function 26 will now be described in greater detail. Write processing function 26 is initiated whenever there are any instructions in express que 108 to be processed or when there are any frames in frame storage 112 which can be sent. In step 258, FIG. 13, the transmit state for write processing function 26 is examined to determine whether it is in the send disconnect mode, SEND_DISC. If such is the case, step 260 is executed to cause frames to be sent to the remote station whereby the communications link can be terminated in an orderly fashion.

If, in step 258, the transmit state is not in the send disconnect mode, step 262 is processed to set the flags for the heartbeats for $N_R$ and $N_S$ to indicate that the heartbeats have not been sent. Thereafter, step 264 is executed to determine whether more frames can be written into FIO buffer 118. When the system is first powered up, such space will be available in FIO buffer 118. During the normal operation of the data flow processor 20, frames for transmission are written into FIO buffer 118 until the buffer is full. Thereafter, step 276, at the bottom of FIG. 13, is executed to verify that the frames in FIO 118 are ready to be transmitted. Thereafter, FIO buffer 118 is accessed by communication processor 40 and the frames are placed on the communications link.

If, in step 264, more space is available in FIO buffer 118, step 266 is executed to determine whether only the last portion of FIO buffer 118 is remaining and whether a heartbeat is required to be sent. The heartbeat requirement can arise where the previous frames stored in FIO buffer 118 are selective reject frames or I frame responses or other types of frames which do not provide the current send and receive sequence numbers $N_S$ and $N_R$, respectively.

If a heartbeat is required and only the last portion of FIO buffer 118 remains, step 268 is executed wherein a heartbeat frame is generated and the heartbeat timer reset. Hereinafter, this step will be referred to as DOHART step 268.

If, on the other hand, the answer in step 266 is "no", step 270 is executed in which a frame is assembled in accordance with entries in the express que 108, or if no such entries exist, from the information in frame storage 112. Step 270, hereinafter referred to as GETFRM 270, causes the assembly of the frames and the writing of the frames into FIO buffer 118.

In GETFRM step 270, a single frame is assembled for each execution of the step. Thus, in step 272, a check is made to determine whether the system is out of frames to write, or whether a heartbeat is needed. If the answer is "no", step 276 is executed to determine whether a complete write program has been built, or whether the system is out of frames to write.

Where, in step 272, a heartbeat is desired, a heartbeat frame is generated and the heartbeat timer is reset as in step 268.

If, in step 276, it is determined that there are additional frames to be written, or that a complete write program has yet to be built, write processing function 2 returns to step 264 to continue building frames.

Figure 14:
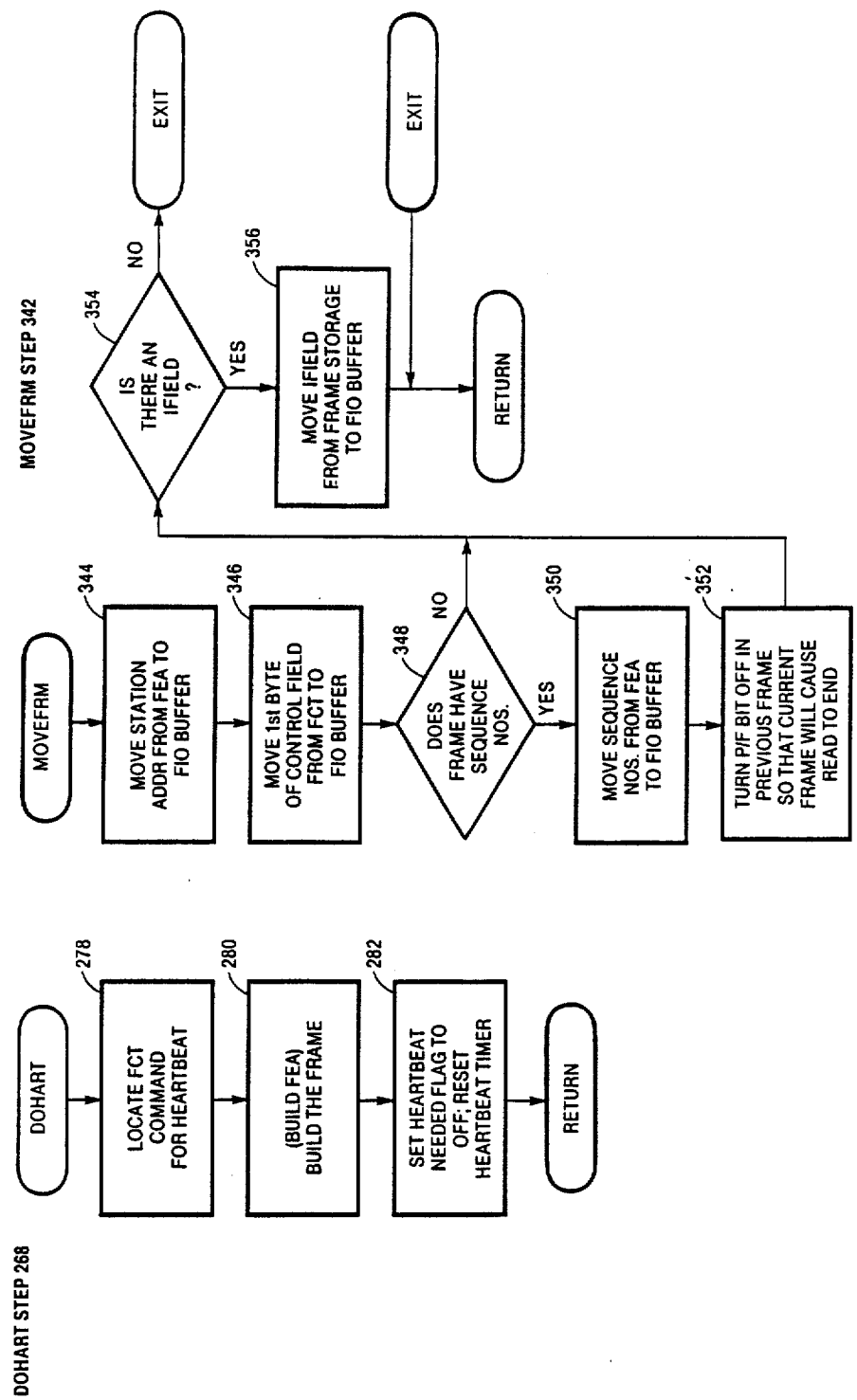
FIG. 14 provides a detailed flow diagram if DOHART step 268 of FIG. 13.

Referring more specifically to FIG. 14, DOHART step 268 and DOHART step 274 will be described in greater detail. In step 278, write processing function 26 accesses FCT 114 to obtain the command pattern for a heartbeat. This command pattern is then utilized in step 280 to build a heartbeat frame. Hereinafter, step 280 will be referred as BILDFEA step 280. After execution of BILDFEA step 280, step 282 is processed wherein the heartbeat needed flag is set to "off" and the heartbeat timer is reset. Upon completion of step 282, DOHART step 268 is exited.

Figure 15:
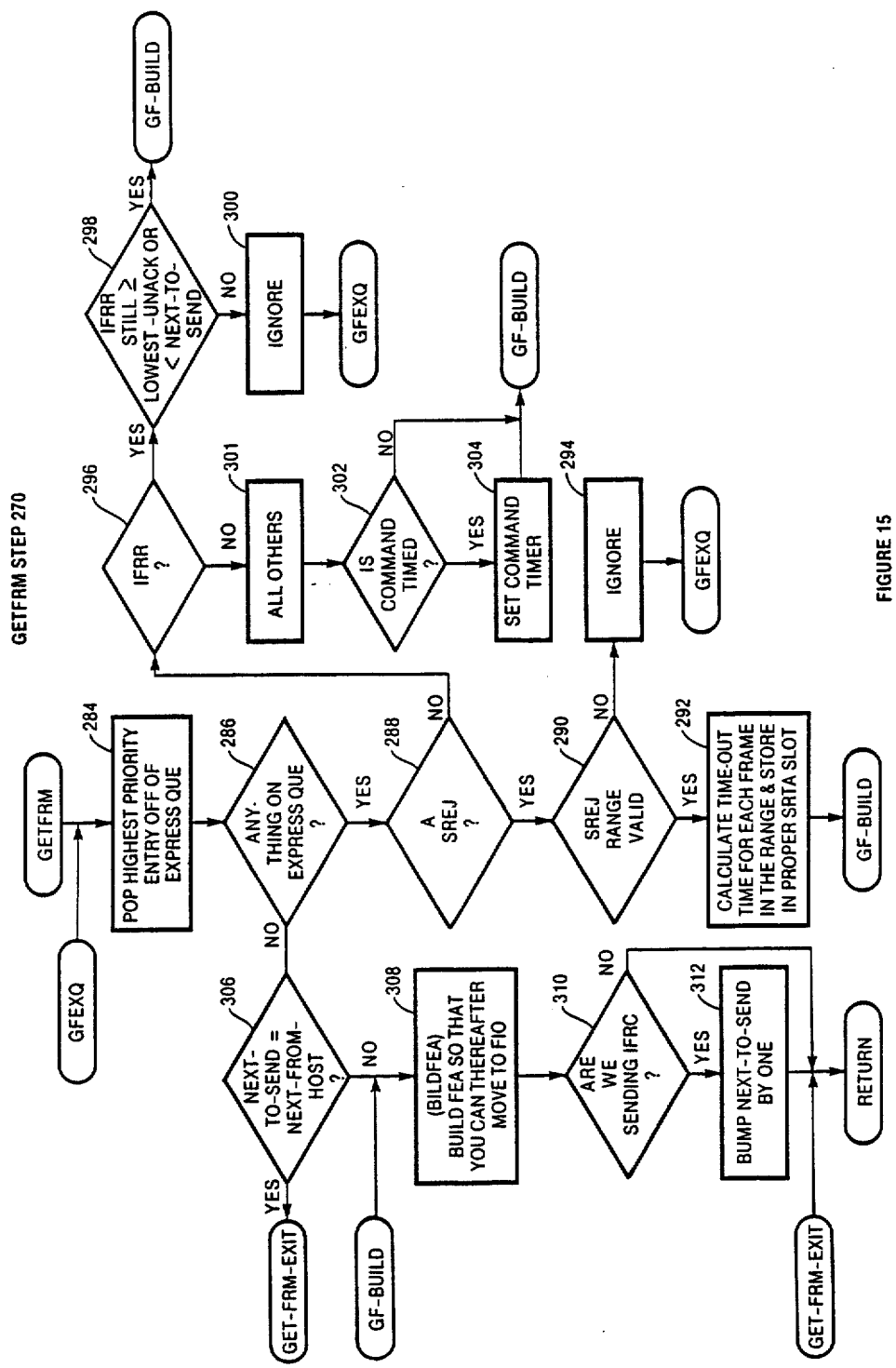
FIG. 15 provides a detailed flow diagram of GETFRM step 270 of FIG. 13.

Referring more particularly to FIG. 15, GETFRM step 270 will now be described in greater detail. Recall that in GETFRM step 270, frames are assembled from information in frame storage 112, from commands retrieved from FCT 114, and from information stored in frame element area FEA 116.

In step 284, the express que 108 is accessed for its highest priority entry. In step 286, it is determined whether or not the express que had any instructions in it. If not, processing is begun on the information in frame storage 112, starting from step 306.

If, on the other hand, an instruction is present in express que 108, a step 288 is executed to determined whether the instructions correspond to a selective reject command. If such is the case, step 290 is executed to determine whether the sequence number of the frame being rejected is valid. As was discussed earlier in connection with read processing function 42, a situation may arise where a selective reject command is sent to the remote station, and the remote station responds by retransmitting the frame. Where the selective reject timer in the local station expires before a receipt of the retransmitted frame, a second selective reject command will be sent. Thereafter, the response frame corresponding to the selectively rejected frame will be received by the local station and the selective reject flag removed from the particular sequence. Thereafter, the remote station will have responded to the second selective reject command and retransmitted the desired frame. In step 290, the system is checking to verify whether the selective reject command that has been queued on the express que 108 really needs to be sent. If the flag corresponding to the sequence number in the SRTA indicates that a frame has successfully been received, step 294 will be executed to ignore the current instruction.

If, on the other hand, step 290 indicates that the selective reject sequence number is within a valid range, step 292 is executed to (1) calculate a timer value for each frame being selectively rejected, as where the range of frames is being selectively rejected, and (2) store the timer value in the corresponding slot of the SRTA 110. The timer value is that period in time after which read processing function 42 will requeue a selective reject command, where no corresponding I frame response is received. The timer value allows for link propagation time and response time. After execution of step 292, the system proceeds to step 308, wherein the frame is actually built.

If, in step 288, it is determined that the express que instruction does not correspond to a selective reject command, step 296 is executed to determine whether an I frame response is being requested. Step 298 is executed whether the I frame response request corresponds to a sequence number greater than or equal to the lowest unacknowledged frame, LOWEST_UNACK, or less than the next frame to be sent, NEXT_TO_SEND. If the sequence number for the I frame responses is outside of the indicated range, step 300 is executed to ignore the current instruction. Thereafter, the system returns to step 284 to obtain the next instruction from the express que 108.

If, in step 298, the sequence number for the I frame response is determined to be within range, the system proceeds to step 308 to build an I frame response.

If it is indicated that the instruction does not correspond to an I frame response, step 301 is executed to handle all of the other possible commands such as reject commands, SABM commands, and unnumbered initialization commands. Thereafter, step 302 is executed to determine whether the particular commands are to be timed. If so, step 304 is executed to set the command timer for the particular type of frame. Thereafter, or where in step 302 the command is not to be timed, the system proceeds to step 308 to build the actual frame.

Returning to step 286, when it is determined that there are no instructions from the express que this indicates that information from the frame storage 112 is to be processed. Thus, step 306 is next executed to determine whether the NEXT_TO_SEND value in the send window is equal to the NEXT_FROM_HOST value. If so, this indicates that all of the frames provided by the host for transmission have been built and provided to FIO buffer 118. If the answer in step 306 is "yes", then GETFRM step 270 is executed. If, on the other hand, the answer in step 306 is "no", step 308 is executed to build the frame element area so that the frame can be moved to the FIO buffer 118. Hereinafter, step 308 will be referred to as BILDFEA step 308.

After BILDFEA 308 is completed, step 310 is executed to determine whether an I frame command is being sent by way of the frame that was just built. If "yes", step 312 is executed to increment the NEXT_TO_SEND value in the send window by one. If, in step 310, the answer is "no" or upon completion of step 312, the GETFRM step 270 is exited.

Figure 16:
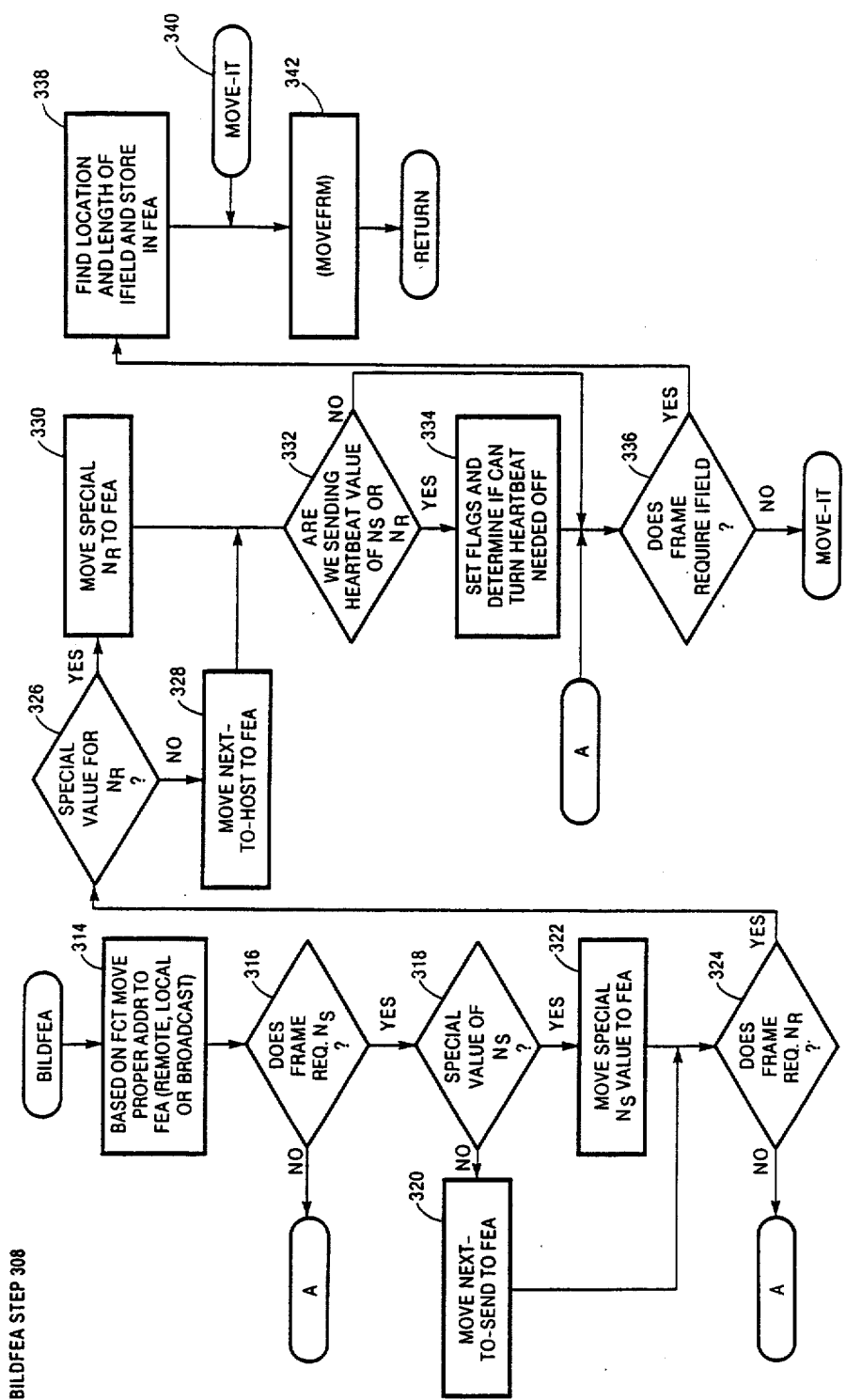
FIG. 16 provides a detailed flow diagram of BILDFEA step 342 of FIG. 13.

Referring more particularly to FIG. 16, BILDFEA step 308 will now be described in greater detail. Recall that BILDFEA step 308 performs the actual gathering of the various information required to assemble a frame.

In step 314, the FCT 114 is accessed to determine the proper address to be entered into the frame, by way of frame element area 116, for the type of frame sought to be sent. These addresses can be the address of the remote station for an information type frame, the address of the local station for a response type frame, or all ones for a broadcast type frame. Thereafter, step 316 is executed to determine whether the frame requires a send sequence number, $N_S$. If not, processing is resumed at step 336 to determine whether the frame requires an information field.

If, on the other hand in step 316, it is determined that $N_S$ is required, step 318 is executed to determine whether a special value of $N_S$ is desired. For example, where a selective reject command is being sent, a high end of the range and a low end of the range for $N_S$ will be required. Similarly, where an I frame response is being sent, the value for $N_S$ will be the sequence number of the frame being sent.

Where a special value is required in step 318, the special value is moved to FEA 116 in step 322. If no special value is required, then the value for $N_S$ will be the next send value. This value will be moved to the FEA 116 in step 320.

Upon completion of step 320 or 322, step 324 is executed to determine whether a receive sequence number, $N_R$ is required. If so, step 326 is executed to determine whether a special value is desired. If the answer in step 324 is "no", then processing resumes at step 336.

If, in step 326, a special value for $N_R$ is indicated, the special value is moved into FEA 116 by step 330. If, on the other hand, a special value is not required for $N_R$, the command expected value from the receive window is moved into FEA 116.

Upon completion of step 328 or step 330, step 32 is executed in which it is determined whether a heartbeat value for $N_S$ or $N_R$ is being sent. If such is the case, step 334 is executed to set the heartbeat sent flag and to determine whether the heartbeat needed flag can be turned off. In the latter case, this need arises when only one of the current $N_S$ or $N_R$ is sent.

Thereafter, or where the answer in step 332 is "no", processing is resumed at step 336. In step 336, it is determined whether the frame requires an information field. If "yes", step 338 is executed in which the location and length of the I field is determined and this location and length is stored in FEA 116. Thereafter, or where in step 336 the answer is "no", the frame is moved into the FIO buffer 118 by way of steps 340 and 342. Hereafter, step 342 will be referred to as MOVEFRM step 342.

Referring more particularly to FIG. 17, MOVEFRM step 342 will now be described in greater detail.

In step 344, the station address is moved from the FEA 116 to the FIO buffer 118. In step 346, the first byte of the control field is moved from the frame control table 114 to the FIO buffer 118. In step 348, it is determined whether the frame has sequence numbers. If "yes", the sequence numbers are moved from the FEA 116 to the FIO buffer 118 in step 350. In step 352, the pole final bit, P/F, is turned off in the previous frame stored in the FIO. Where a poll final bit is turned on, this indicates to the communication processor 40 on the receiving end that the current read should end. Thus, where a new frame is being written into the FIO buffer, the new frame has the potential for being the last frame in the transmission. The poll final bit is thus turned on. The previous frame having been written initially with the poll final bit being on, thus should have its poll final bit turned off so that the next frame can be read.

Upon completion of step 352 or where the answer in step 348 is "no", step 354 is next executed to determine whether an I field is required. If "no", MOVEFRM is exited. If "yes", the I field is moved from frame storage 112 to the FIO buffer 118 in step 356. Thereafter, MOVEFRM step 342 is exited.

In the present invention, I frames are not timed. Instead, when message flow is low, a heartbeat is periodically sent by each of the stations in the form of a supervisory frame which indicates a station active condition and provides current values of $N_S$ and $N_R$. The receiving station compares the $N_S$ to the value it has stored for COMMAND_EXPECTED. If the two are not equal, the receiving station concludes that the intervening frames were lost in transmission and updates its HOLE file accordingly. The interval at which the heart beat is sent in periods of low traffic is called HOST_IDLE_INTERVAL which is selected by the user.

The terms and expressions which have been employed here are used as terms of description and not of limitations, and there is no intention, in the use of such terms and expressions of excluding equivalents of the features shown and described, or portions thereof, it being recognized that various modifications are possible within the scope of the invention claimed.

We claim:

1. A communication system comprising a first and a second station wherein data frames are transmitted from the first station to the second station through a first communication link, each data frame including data and an identification number, said data frames having a selected frame size, said identification numbers of the frames being in the sequential order of transmission to facilitate frame identification, said first station storing the data frames transmitted by the first station and said second station storing the data frames received by the second station, said second station transmitting through the first or a second communication link data groups including acknowledgement information relating to the identification members of data frames successfully received by the second station;

said first station storing the data frames in such manner that the identification numbers of the frames are within a variable range of identification numbers defining a first window having an upper and lower limit wherein the first station evaluates the acknowledgement information received from the second station to vary the upper and lower limits of the first window; and said second station storing the data frames in such manner that the identification numbers of the frames are within a variable range defining a second window having an upper and lower limit for a variable range of identification numbers of possible data frames from the first station acceptable to the second station, wherein said second station evaluates the data frames received from the first station to vary the upper and lower limits of the second window, the difference between the upper and lower limits of each window defining its size;

wherein at least one of the two stations is such that the size of the first or the second window is selectable according to the speed, length or error rate of the first or the first and second communication links or the frame size used in connection therewith to increase the efficiency in communication link utilization.

2. The system of claim 1, wherein said second station transmits acknowledgement information through the second communication link, and wherein both the first and second windows are selected according to the speed, length and error rates of the first and second communication links respectively and the frame size used in connection therewith.

3. The system of claim 1, wherein said second station also transmits data to the first station, such data being arranged in data groups in which the acknowledgement information is piggybacked.

4. The system of claim 1, wherein said first and second stations each comprises a data flow processor for storing data frames and for evaluating the data frames received from the other station to vary the upper and lower limits of the window of the station.

5. A method for transmitting data frames from a first station to a second station through a first communication link, each data frame including data and an identification number, said data frames having a selected frame size, said identification numbers of the frames being in the sequential order of transmission to facilitate frame identification, said first station storing the data frames transmitted by the first station and said second station storing the data frames received by the second station, said second station transmitting through the first or a second communication link data groups including acknowledgement information relating to the identification numbers of data frames successfully received by the second station; said method comprising:

defining a first window having an upper and lower limit so that the data frames stored by the first station are such that their identification numbers are within the window and evaluating the acknowledgement information received from the second station to vary the upper and lower limits of the first window; and defining a second window for a variable range of identification numbers of possible data frames from the first station acceptable to the second station, so that the data frames stored by the second station are such that their identification numbers are within the second window, and evaluating the data frames received from the first station to vary the upper and lower limits of the second window, the difference between the upper and lower limits of each window defining its size;

wherein the size of the first or the second window is defined in either one of the defining steps according to the speed, length or error rate of the first or the first and second communication links or the frame size used in connection therewith to increase the efficiency in communication link utilization.

6. A communication system comprising a first and a second station, wherein data frames are transmitted from the first station to the second station through a first communication link and the second station transmits acknowledgement information concerning the data frames received through the first or a second communication link, wherein (a) each data frame includes data and an identification number, said identification numbers of the frames being in the sequential order of transmission to facilitate frame identification, said first station storing the data frames transmitted by the first station and said second station storing the data frames received by the second station, wherein (b) the identification numbers of the frames stored by the first station are within a variable range of identification numbers defining a first window having an upper and lower limit wherein said first control means evaluates the acknowledgement information received from the second station to vary the upper and lower limits of the first window; wherein (c) the data frames stored by the second station are such that their identification numbers are within a variable range defining a second window having an upper and lower limit for a variable range of identification numbers of possible data frames from the first station acceptable to the second station, said second control means evaluating the data frames received from the first station to vary the upper and lower limits of the second window; wherein (d) the difference between the upper and lower limits of each window defining its size;

wherein each station has an initial set of link parameters, wherein before data frames and acknowledgement information are transmitted the two stations exchange the sets of link parameters and generate a modified set of link parameters representing a compromise between the two initial sets of link parameters, and wherein one of the parameters exchanged is the sizes of the first and second windows.

7. The system of claim 6, wherein one of the first and second stations requests communication with the other station so that parameters are subsequently exchanged, resolves the received set of link parameters with its own, and transmits the modified set of link parameters to the other station.

8. The system of claim 6, wherein said second station transmits acknowledgement information through the second communication link, wherein the first and second stations have respectively high and low levels of information traffic, and wherein the first and second communication links are high and low speed links respectively.

9. The system of claim 8, wherein said second station also transmits data to the first station, such data being arranged in data groups in which the acknowledgement information is piggybacked.

10. A method for transmitting data frames from a first to a second station through a first communication link, wherein the second station transmits acknowledgement information concerning the data frames received through the first or a second communication link, wherein (a) each data frame includes data and an identification number, said identification numbers of the frames being in the sequential order of transmission to facilitate frame identification, said first station storing the data frames transmitted by the first station and said second station storing the data frames received by the second station, wherein (b) the identification numbers of the frames stored by the first station are within a variable range of identification numbers defining a first window having an upper and lower limit wherein said first control means evaluates the acknowledgement information received from the second station to vary the upper and lower limits of the first window; wherein (c) the data frames stored by the second station are such that their identification numbers are within a variable range defining a second window having an upper and lower limit for a variable range of identification numbers of possible data frames from the first station acceptable to the second station, said second control means evaluating the data frames received from the first station to vary the upper and lower limits of the second window; wherein (d) the difference between the upper and lower limits of each window defining its size; wherein each station has an initial set of link parameters; said method comprising:

exchanging, before data frames are transmitted, the initial sets of link parameters including the sizes of the first and second windows and generating a modified set of link parameters representing a compromise between the two initial sets of parameters.

* * * * *